United States Patent
Ito et al.

(10) Patent No.: US 7,650,515 B2
(45) Date of Patent: Jan. 19, 2010

(54) SECURE PROCESSING DEVICE, METHOD AND PROGRAM

(75) Inventors: Takayuki Ito, Osaka (JP); Yoshikatsu Ito, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 12/160,281

(22) PCT Filed: Feb. 2, 2007

(86) PCT No.: PCT/JP2007/051804

§ 371 (c)(1),
(2), (4) Date: Jul. 8, 2008

(87) PCT Pub. No.: WO2007/091492

PCT Pub. Date: Aug. 16, 2007

(65) Prior Publication Data

US 2009/0013196 A1    Jan. 8, 2009

(30) Foreign Application Priority Data

Feb. 6, 2006    (JP)    ............................. 2006-028580

(51) Int. Cl.
*G06F 11/30* (2006.01)
*G06F 12/14* (2006.01)

(52) U.S. Cl. ...................... 713/193; 713/187; 713/189; 713/300; 380/201; 380/252

(58) Field of Classification Search .................. 713/193
See application file for complete search history.

(56) References Cited

U.S. PATENT DOCUMENTS

| 6,151,664 | A | 11/2000 | Borkenhagen et al. | |
| 6,654,820 | B1* | 11/2003 | Ishibashi et al. | 710/34 |
| 6,938,162 | B1* | 8/2005 | Nagai et al. | 713/189 |
| 2005/0198404 | A1* | 9/2005 | Kawakami et al. | 710/1 |

FOREIGN PATENT DOCUMENTS

| JP | 5-143478 | | 6/1993 |
| JP | 2001202167 A | * | 7/2001 |
| JP | 2003-501747 | | 1/2003 |
| JP | 2005-189969 | | 7/2005 |

OTHER PUBLICATIONS

International Search Report issued Mar. 6, 2007 in the International (PCT) Application PCT/JP2007/051804 of which the present application is the U.S. National Stage.

* cited by examiner

*Primary Examiner*—Matthew B Smithers
*Assistant Examiner*—Shewaye Gelagay
(74) *Attorney, Agent, or Firm*—Wenderoth, Lind & Ponack, L.L.P.

(57) ABSTRACT

A secure processing device having a power saving mode, which is used for built-in apparatuses, calculates a hash value of secure data that needs to be saved when switching to the power saving mode, stores the calculated hash value in a protection storage unit whose data is not lost even in the power saving mode, encrypts the secure data and stores the encrypted data in an external memory when switching to the power saving mode. When switching back to the normal power mode, the secure processing device decrypts the encrypted data, calculates a hash value of the decrypted data and compares the hash value with the hash value stored in the protection storage unit. The decrypted data is restored to the protection storage unit when the hash values are identical, but discarded together with the encrypted data stored in the external memory when the hash values are not identical.

27 Claims, 5 Drawing Sheets

SECURE PROCESSING DEVICE, METHOD AND PROGRAM

TECHNICAL FIELD

The present invention relates to a secure processing device that has a mechanism for securely processing target data that needs to be confidential, and that operates by switching between a normal power mode and a power saving mode. In particular, the present invention relates to a technique for securely saving the target data in an external memory during a process of switching to the power saving mode, and for securely switching back to the normal power mode from the power saving mode.

BACKGROUND ART

It is disadvantageous for a copyright holder and the like that data of contents such as music data is copied or programs for playing the contents are tampered with in an unauthorized manner. Therefore, it is preferable for the copyright holder and the like that such valuable data is securely processed.

In order to meet the demand, provided is a secure processing device that can securely process data that needs to be confidential.

An integrated circuit having a secure memory inside is an example of such a secure processing device. This secure memory has a mechanism to prevent unauthorized access from outside.

Specifically, in this type of integrated circuit, only a CPU inside the integrated circuit can access the secure memory. Also, the CPU can access the secure memory only when the operation mode thereof is set to a secure mode.

As described above, the secure processing device keeps target data confidential by limiting (i) the subject that is accessible to a storage region storing the target data that needs to be confidential and (ii) an opportunity to access the data.

Some secure processing devices operate by switching between a normal power mode and a power saving mode. While operating in the power saving mode, the secure processing device operates at lower power consumption by limiting parts of the functions. For example, the power supply may be limited, and the CPU may be switched to a sleep mode. A secure processing device having the power saving mode is used, for example, in a battery-powered portable apparatus and the like. In this way, the secure processing device in the portable apparatus securely performs a process with target data that needs to be confidential such as music data while the operation time of the portable apparatus is lengthened.

Also, in the secure processing device, a storage having a mechanism to prevent unauthorized access from outside is usually a volatile memory, to enable the high-speed access of the CPU. Since the storage is usually a volatile memory, data stored therein is lost when the secure processing device is switched to the power saving mode. Therefore, in a case where music data, an important program for playing music and the like are stored only in the storage region, such data and program are cleared every time the secure processing device is switched to the power saving mode.

This may cause inconvenience to a user of an apparatus having the secure processing device.

The following specifically describes such a case by taking an example of when the user of the apparatus plays music data. Assume here that the portable apparatus has been switched to the power saving mode while the user is playing music data. In this case, when the user attempts to resume the music data after the portable apparatus has been switched back to the normal power mode from the power saving mode, the user may have to deal with an unfavorable situation, since the music data in the storage region is lost. For example, the user may have to wait until the music data is read into the storage region to be stored therein again, or the user may have no choice but to start from the beginning of the music data, since information such as a playback position of the music data is lost.

In a technique that is conventionally used in view of the above-described problem, data stored in the storage region is saved into an external memory outside the secure processing device when the secure processing device is switched to the power saving mode. When the secure processing device is switched from the power saving mode to the normal power mode, the data saved in the external memory is restored to the storage region. This enables the secure processing device to resume a processing that was being performed in the normal power mode. As a result, the user does not suffer the inconvenience described above.

However, the above-described technique may cause the secure processing device to go out of control if abnormal data is restored to the secure processing device. Therefore, it is preferable to safely save data into an external memory, and safely restore the data to the secure processing device.

To solve the problem described above, the below-described patent document 1 discloses a technique for saving data into an external memory using a normal procedure. Specifically, the secure processing device stores a keyword in a register when switching to the power saving mode. Then, before saving data into the external memory, the secure processing device judges whether or not the keyword is identical with the content of the register. If judging affirmatively, the secure processing device saves the data into the external memory.

With the above-described technique, even when going out of control and attempting to perform a process of switching to the power saving mode by skipping a process of storing the keyword in the register, the secure processing device terminates the process in response to the detection that the keyword is not consistent with the content of the register.

Patent Document 1: Japanese Laid-open Patent Application No. 5 (1993)-143478.

DISCLOSURE OF THE INVENTION

The Problems the Invention is Going to Solve

With the technique disclosed in the above-described Patent Document 1, it is possible to prevent a secure processing device from switching to the power saving mode in an abnormal procedure caused by the secure processing device going out of control. As a result, data to be saved into an external memory is always appropriate.

However, even with the technique of the Patent Document 1, if the saved data is tampered with or damaged, the abnormal data is restored to the secure processing device when switching back to the normal power mode. This means that the secure processing device cannot securely switch back to the normal power mode. For example, the data saved in the external memory may be tampered with, which results in a malicious program being restored to the secure processing device and executed therein. Consequently, target data that needs to be confidential may be exposed by, for example, a process of outputting the data in the storage region to an outside source.

The object of the present invention is therefore to provide a technique that enables a secure processing device having a power saving mode to securely save target data that needs to be confidential in an external memory, and securely restore the data saved in the external memory to the secure processing device.

Means to Solve the Problems

In order to solve the above-described problems, the present invention provides a secure processing device that switches between a normal power mode and a power saving mode, and performs processing using target data in the normal power mode, the target data being data to be treated confidentially, the secure processing device comprising: a secure storage unit having a first memory that is to be protected from unauthorized access from outside, the first memory holding first target data in the normal power mode and losing the first target data in the power saving mode; a protection storage unit having a second memory that is to be protected from the unauthorized access from outside, the second memory holding data both in the power saving mode and the normal power mode, a size of the second memory being smaller than a size of the first memory; an encryption/decryption unit operable to encrypt the first target data to generate ciphertext during a first switching process, and decrypt the ciphertext to generate second target data during a second switching process, the first switching process being switching from the normal power mode to the power saving mode, and the second switching process being switching from the power saving mode to the normal power mode; a generation unit operable to generate an authentication code based on the target data during the first switching process, a size of the authentication code being smaller than the target data; a switch control unit operable to, during the first switching process, cause (i) the generation unit to generate a first authentication code, based on the first target data, (ii) the protection storage unit to store therein the first authentication code, (iii) the encryption/decryption unit to encrypt the first target data, and (iv) an external memory to store therein the ciphertext; an authentication code generation control unit operable to, during the second switching process, cause (i) the encryption/decryption unit to decrypt the ciphertext stored in the external memory, and (ii) the generation unit to generate a second authentication code, based on the second target data; a judgment unit operable to judge whether or not the second authentication code is identical with the first authentication code; and a restoration control unit operable to prohibit restoring of the second target data to the secure-storage unit when the judgment is in the negative, and restore the second target data to the secure storage unit when the judgment is in the affirmative.

Effects of the Invention

The secure processing device having the above-described structure generates (i) the first authentication code based on the target data when switching to the power saving mode, and (ii) the second authentication code based on data targeted to be restored to the secure storage unit, when switching back to the normal power mode. Then, the secure processing device controls whether to restore the data saved in the external memory, by comparing the first authentication code with the second authentication code.

The authentication code generated by the generation unit is determined based on data for which the authentication code is generated. This makes it possible for the secure processing device to judge whether or not the data targeted to be restored to the secure storage unit is identical with the data saved in the external memory, by comparing the first authentication code with the second authentication code.

When judging affirmatively, the secure processing device restores the saved data, namely the data saved in the external memory, to the secure storage unit. When judging negatively, the secure processing device does not restore the saved data to the secure storage unit, since the saved data is assumed to be abnormal by being tampered with or such.

With the above-described manner, the secure processing device securely restores the data saved in the external memory, without restoring abnormal data.

Furthermore, the encryption/decryption unit of the secure processing device encrypts data before saving the data in the external memory. Then, the secure processing device saves the encrypted data in the external memory. This makes it possible for the secure processing device to securely save the target data that needs to be confidential into the external memory.

Also, with the above-described structure, the generation unit generates an authentication code whose size is smaller than data for which the authentication code is generated. Therefore, the memory region of the protection storage unit that stores the authentication code is smaller than the memory region of the secure storage unit.

As a result, the secure processing device having the above-described structure realizes power-saving while securely managing the target data that needs to be confidential. Furthermore, the secure processing device is prevented from becoming large. For example, in a case where the secure processing device is an integrated circuit, the integrated circuit can be smaller. Therefore, the secure processing device having the above-described technical features can be easily realized in an integrated circuit that is desired to be smaller.

In order for the secure processing device to perform a predetermined process at high speed, the capacity of the secure storage unit that is for storing important data may not be large enough to store all the data. In this case, the secure processing device encrypts data of important programs and such with use of a predetermined encryption key (referred to as "bus encryption key" hereinafter). The secure processing device securely stores the bus encryption key. Also, the secure processing device stores the data that has been encrypted with the bus encryption key into an external storage region (referred to as "bus encryption region" hereinafter).

With the above-described structure, the secure processing device securely performs a process using the target data that needs to be confidential, even when the capacity of the secure storage unit is not large enough.

However, if the bus encryption key stored in the secure processing device is lost when switching to the power saving mode, the secure processing device cannot resume the process due to the loss of the key for decrypting the data in the bus encryption region.

Assume here that the secure processing device can generate one bus encryption key at any time, based on unchanged information such as information unique to the device, and continues to use the generated bus encryption key. In this case, even though a bus encryption key is lost in a process of switching to the power saving mode, the secure processing device regenerates the same bus encryption key. Therefore, the secure processing device can decrypt the data in the bus encryption region by using the regenerated bus encryption key, after switching back to the normal power mode.

However, if a bus encryption key that is for decrypting data in the bus encryption region is always the same, the bus encryption key may be cracked by an unauthorized person analyzing the data in the bus encryption region. As a result, important data stored in the bus encryption region may be exposed. Therefore, it is preferable that a bus encryption key is changed as needed.

As described above, in the case where the secure processing device does not always use one bus encryption key, if a bus encryption key that has been used for encryption is lost, the secure processing device cannot resume a process that uses data in the bus encryption region, after switching back to the normal power mode from the power saving mode. As a result, the secure processing device needs to perform an extra process such as rewriting data in the bus encryption region.

In view of the above-described problem, it is preferable that the secure processing device can also resume a process that uses important data stored in the bus encryption region, after switching back to the normal power mode from the power saving mode, as is the case with the data stored in the secure storage unit.

Therefore, the present invention may be the secure processing device that further performs a processing using at least one data piece confidentially, by encrypting the at least one data piece with use of at least one corresponding bus encryption key, and storing the at least one encrypted bus encryption key in a bus encryption region that is an external storage region, wherein the secure storage unit further stores therein the at least one bus encryption key, the switch control unit includes a key saving control unit operable to, during the first switching process, control (i) encryption of the at least one bus encryption key stored in the secure storage unit and (ii) storing the at least one encrypted bus encryption key in the external memory, and the restoration control unit includes: a key decryption control unit operable to decrypt the at least one encrypted bus encryption key stored in the external memory, to generate at least one decrypted bus encryption key; and a key restoration unit operable to restore the at least one decrypted bus encryption key to the secure storage unit.

With the above-described structure, the secure processing device can resume a process that uses data in the bus encryption region, after switching back to the normal power mode from the power saving mode. Therefore, it is possible to shorten the time period from when the secure processing device has switched back to the normal power mode to when the secure processing device starts performing the process again.

Note that the above-described secure processing device that uses the bus encryption region and bus encryption key may be realized with use of a predetermined circuit, a register and such, so that the secure processing device can perform processes at high speed.

Specifically, the secure processing device may further comprise: at least one key storage register that stores therein the at least one corresponding bus encryption key, and whose data is lost when the first switching process is completed; and at least one bus encryption circuit operable to encrypt data that is to be input to the bus encryption region, and decrypt data that is to be output from the bus encryption region, with use of the at least one bus encryption key stored in the at least one corresponding key storage register, wherein the at least one bus encryption key stored in the secure storage unit is identical with the at least one bus encryption key stored in the at least one key storage register, and the key restoration unit causes the at least one decrypted bus encryption key to be stored in the at least one corresponding key storage register.

With the above-described structure, a process that uses the bus encryption region is securely performed at high speed.

Furthermore, it is preferable, for example, to use a different bus encryption key for each important data piece when performing the above-described process that uses the bus encryption region to increase security. In this way, even if one bus encryption key were to be cracked, data pieces encrypted with use of other bus encryption keys are not exposed.

The above-described technique may be realized by having a plurality of combinations of bus encryption circuits and bus encryption key storage registers (hereinafter referred to as "key storage registers), and associating each of the combinations with a different important data piece. Since more than one key storage register is used here, the secure processing device needs to perform extra processes when attempting to read each of the bus encryption keys in the respective key storage registers while switching to the power saving mode. Such processes include specifying the registers that store the bus encryption keys and reading the bus encryption keys. This may cause delay in switching to the power saving mode, and may also cause saving of the bus encryption keys to be incomplete although the secure processing device has already switched to the power saving mode.

Therefore, the secure processing device may further comprise pairs of the key storage registers and the bus encryption circuits, wherein the pairs respectively correspond to the data pieces stored in the bus encryption region, the bus encryption keys stored in the secure storage unit are identical with the bus encryption keys stored in the key storage registers, the key saving control unit, during the first switching process, causes (i) the bus encryption keys stored in the secure storage unit to be encrypted, and (ii) the encrypted bus encryption keys to be stored in the external memory, the key decryption control unit decrypts the encrypted bus encryption keys, to generate decrypted bus encryption keys, and the key restoration unit restores the decrypted bus encryption keys to the secure storage unit.

With the stated structure, the secure storage unit stores therein a plurality of encryption keys identical with the bus encryption keys in the key storage registers. This makes it possible for the secure processing device to, during the process of switching to the power saving mode, save the bus encryption keys and such into the external memory without specifying or searching the key storage registers of the bus encryption keys that are to be saved. As a result, it is possible to avoid, for example, a situation where the process of saving data is incomplete although the secure processing device has already switched to the power saving mode.

In a case of reducing power consumption, it is preferable to reduce the necessary power supply in the power saving mode.

Therefore, the protection storage unit may be a nonvolatile memory.

With the above-described structure, the protection storage unit holds data without power supply. Therefore, the power consumption of the secure processing device is reduced compared to a case where the protection storage is a volatile memory.

The protection storage unit may have the following structure to improve the security of the secure processing device.

In other words, the protection storage unit may be a volatile memory, for which power is supplied even in the power saving mode.

Assume here that an authentication code stored in the protection storage unit is exposed by an unauthorized analysis. In this case, an unauthorized person may estimate the original data, based on the exposed authentication code, and may also create unauthorized data that causes the generation unit to generate the same authentication code as the exposed authentication code.

To avoid such a situation, the secure processing device with the above-described structure includes the protection storage unit that is a volatile memory. Therefore, the protection storage unit holds data in the power saving mode, and loses the data when the secure processing device is turned off. This prevents the authentication code from being exposed by an unauthorized analysis performed on the protection storage unit when the secure processing device is turned off. Furthermore, the structure of the protection storage eliminates the need of a tamper-resistant measure and the like.

In other words, the simple structure described above increases the security of the secure processing device against an unauthorized analysis.

Pertaining to a generation method of the authentication code generated by the generation unit, the secure processing device may have the following structure to improve security.

In other words, the generation unit may calculate a hash value using a hash function, based on the target data, and the authentication code generated by the generation unit may be the calculated hash value.

A hash value is a function for generating, from certain data, a pseudo-random number having a fixed length. The function is also referred to as a "message digest function". A value generated by using the hash function is referred to as a "hash value". The hash function includes a one-way function, which is irreversible. Therefore, it is difficult to estimate original data from a calculated hash value. Also, in the hash function, it is difficult to generate different data that has the same hash value as certain data.

Therefore, with the above-described structure, even if the authentication code stored in the protection storage unit were to be exposed, estimating the original data from which the authentication code has been generated, namely target data that needs to be confidential, is difficult. It is also difficult for an authorized person to generate unauthorized data that causes the exposed authentication code to be generated, and to have the unauthorized data stored in the external memory.

Here, considering a case where data saved in the external memory and data targeted to be restored from the external memory are different, in other words, a case where the data saved in the external memory is tampered with or the like, the secure processing device may have the following structure to increase security.

In other words, the restoration control unit may further include: a deletion unit operable to delete the ciphertext stored in the external memory, when the judgment unit judges that the first authentication code is not identical with the second authentication code; and a discarding unit operable to discard the second target data decrypted by the encryption/decryption unit.

With the above-described structure, abnormal data that may have been tampered with or the like is completely deleted from the secure processing device and the external memory. Therefore, it is possible to prevent the secure processing device from accidentally executing an operation using the abnormal data.

Also, whether the target data that is encrypted and saved in the external memory is tampered with or not, it is not preferable to hold the target data saved in the external memory even after the secure processing device has switched back to the normal power mode, since the encrypted target data may be cracked by an unauthorized analysis or the like.

Therefore, the secure processing device may further comprise: a data deletion unit operable to delete the ciphertext stored in the external memory when returning to the normal power mode.

With the stated structure, a period for saving the encrypted target data in the external memory can be minimized, thereby reducing a risk where an unauthorized person accesses the encrypted target data in the external memory or performs an unauthorized analysis.

It is also possible to have the following structure to prevent the target data saved in the external memory from being used in an unauthorized manner.

In other words, the secure processing device may further comprise: a unique information storage unit that stores therein device unique information indicating information unique to the secure processing device for identifying the device, wherein the encryption/decryption unit encrypt the first target data and decrypt the ciphertext, based on the device unique information.

According to the above-described structure, the data saved in the external memory is encrypted based on the device unique information. In other words, the encrypted data saved in the external memory can be decrypted only by a device that has encrypted the data.

Therefore, it is possible to prevent an authorized activity such as an unauthorized analysis in which the data saved in the external memory is read into another device.

The above-described structure is preferable to include the following structure for the security reasons of the secure processing device.

In other words, the unique information storage unit may have a mechanism for preventing the unauthorized access from outside the secure processing device.

The above-described structure makes it possible to reduce the risk of the device unique information leaking from the unique information storage unit in an unauthorized manner. Accordingly, the decryption of the encrypted target data becomes even more difficult, which increases the security of the secure processing device.

In the above-described structure, at the time of saving the encrypted target data into the external memory, the first authentication code is generated for the encrypted target data by the generation unit, based on the target data in the secure storage unit which is data before the encryption. However, the timing of the generation unit generating the authentication code is not limited to such.

Therefore, the present invention may be a secure processing device that switches between a normal power mode and a power saving mode, and performs processing using target data in the normal power mode, the target data being data to be treated confidentially, the secure processing device comprising: a secure storage unit having a first memory that is to be protected from unauthorized access from outside, the first memory holding first target data in the normal power mode and losing the first target data in the power saving mode; a protection storage unit having a second memory that is to be protected from the unauthorized access from outside, the second memory holding data both in the power saving mode and the normal power mode, a size of the second memory being smaller than a size of the first memory; an encryption/decryption unit operable to encrypt the first target data to generate ciphertext during a first switching process, and decrypt the ciphertext to generate second target data during a second switching process, the first switching process being switching from the normal power mode to the power saving mode, and the second switching process being switching from the power saving mode to the normal power mode; a generation unit operable to generate an authentication code based on the target data during the first switching process, a size of the authentication code being smaller than the target data; a switch control unit operable to, during the first switching process, cause (i) the encryption/decryption unit to encrypt the target data, (ii) the external memory to store therein the ciphertext, (iii) the generation unit to generate a first authentication code, based on the ciphertext, and (iv) the protection storage unit to store therein the first authentication code; an authentication code generation control unit operable to, during the second switching process, cause the generation unit to generate a second authentication code, based on the ciphertext stored in the external memory; a judgment unit operable to judge whether or not the second authentication code is identical with the first authentication code; a restoration control unit operable to limit a process for restoring the ciphertext to the secure storage unit when the judgment is in the negative, and, cause the encryption/decryption unit to decrypt the ciphertext when the judgment is in the affirmative, and restore the second target data to the secure processing device.

In the above-described structure, the restoration control unit may limit the process by causing the encryption/decryption unit to not decrypt the ciphertext, when the judgment is in the negative.

According to the above-described structure, the secure processing device compares the second authentication code and the first authentication code that have been generated by the generation unit. Then, depending on the result of the comparison, the secure processing device controls whether or not to decrypt the encrypted target data stored in the external memory. In other words, the secure processing device judges whether or not the data saved in the external memory is abnormal, before performing a decryption process which causes high load.

When the data saved in the external memory is abnormal, the secure processing device can reduce the processing load by not performing the decryption process. Also, when detecting abnormal data, the secure processing device can quickly perform a process related to measures against the abnormal data, such as an abnormal termination.

In the above-described structure, it is also not preferable to hold the data saved in the external memory even after the secure processing device has switched back to the normal power mode.

Therefore, the restoration control unit may further include: a deletion unit operable to delete the ciphertext stored in the external memory, when the judgment unit judges that the first authentication code is not identical with the second authentication code.

With the above-described structure, abnormal data that may have been tampered with or the like is completely deleted from the external memory. Therefore, it is possible to prevent the secure processing device from accidentally executing an operation using the abnormal data.

Also, the present invention may be an information processing method used in a secure processing device that switches between a normal power mode and a power saving mode, and performs processing using target data in the normal power mode, the target data being data to be treated confidentially, wherein the secure processing device comprises: a secure storage unit having a first memory that is to be protected from unauthorized access from outside, the first memory holding first target data in the normal power mode and losing the first target data in the power saving mode; a protection storage unit having a second memory that is to be protected from the unauthorized access from outside, the second memory holding data both in the power saving mode and the normal power mode, a size of the second memory being smaller than a size of the first memory, and the information processing method comprises the steps of: encrypting the first target data to generate ciphertext during a first switching process, and decrypting the cipher text to generate second target data during a second switching process, the first switching process being switching from the normal power mode to the power saving mode, and the second switching process being switching from the power saving mode to the normal power mode; generating an authentication code based on the target data during the first switching process, a size of the authentication code being smaller than the target data; during the first switching process, causing (i) a first authentication code to be generated in the generation step, based on the first target data, (ii) the first authentication code to be stored in the protection storage unit, (iii) the first target data to be encrypted in the encryption step, and (iv) the ciphertext to be stored in an external memory; during the second switching process, cause (i) the ciphertext stored in the external memory to be decrypted in the encryption step, and (ii) a second authentication code to be generated in the generation step, based on the second target data; judging whether or not the second authentication code is identical with the first authentication code; and prohibiting restoring of the second target data to the secure storage unit when the judgment is in the negative, and restoring the second target data to the secure storage unit when the judgment is in the affirmative.

Furthermore, the present invention may be a control program for controlling an operation of a secure processing device that switches between a normal power mode and a power saving mode, and performs processing using target data in the normal power mode, the target data being data to be treated confidentially, wherein the secure processing device comprises: a secure storage unit having a first memory that is to be protected from unauthorized access from outside, the first memory holding first target data in the normal power mode and losing the first target data in the power saving mode; a protection storage unit having a second memory that is to be protected from the unauthorized access from outside, the second memory holding data both in the power saving mode and the normal power mode, a size of the second memory being smaller than a size of the first memory, and the control program comprises the steps of: encrypting the first target data to generate ciphertext during a first switching process, and decrypting the ciphertext to generate second target data during a second switching process, the first switching process being switching from the normal power mode to the power saving mode, and the second switching process being switching from the power saving mode to the normal power mode; generating an authentication code based on the target data during the first switching process, a size of the authentication code being smaller than the target data; during the first switching process, causing (i) a first authentication code to be generated in the generation step, based on the first target data, (ii) the first authentication code to be stored in the protection storage unit, (iii) the first target data to be encrypted in the encryption step, and (iv) the ciphertext to be stored in an external memory; during the second switching process, cause (i) the ciphertext stored in the external memory to be decrypted in the encryption step, and (ii) a second authentication code to be generated in the generation step, based on the second target data; judging whether or not the second authentication code is identical with the first authentication code; and prohibiting restoring of the second target data to the secure storage unit when the judgment is in the negative, and restoring the second target data to the secure storage unit when the judgment is in the affirmative.

The present invention may also be an information processing method used in a secure processing device that switches between a normal power mode and a power saving mode, and performs processing using target data in the normal power mode, the target data being data to be treated confidentially, wherein the secure processing device comprises: a secure storage unit having a first memory that is to be protected from unauthorized access from outside, the first memory holding first target data in the normal power mode and losing the first target data in the power saving mode; a protection storage unit having a second memory that is to be protected from the unauthorized access from outside, the second memory holding data both in the power saving mode and the normal power mode, a size of the second memory being smaller than a size of the first memory, and the information processing method comprises the steps of: encrypting the first target data to generate ciphertext during a first switching process, and decrypting the ciphertext to generate second target data during a second switching process, the first switching process being switching from the normal power mode to the power saving mode, and the second switching process being switching from the power saving mode to the normal power mode; generating an authentication code based on the target data during the first switching process, a size of the authentication code being smaller than the target data; during the first switching process, causing (i) the target data to be encrypted in the encryption step, (ii) the ciphertext to be stored in the external memory, (iii) a first authentication code to be generated in the generation step, based on the ciphertext, and (iv) the first authentication code to be stored in the protection storage unit; during the second switching process, causing a second authentication code to be generated in the generation step, based on the ciphertext stored in the external memory; judging whether or not the second authentication code is identical with the first authentication code; limiting a process for restoring the ciphertext to the secure storage unit when the judgment is in the negative, and, causing the ciphertext to be decrypted in the encryption step when the judgment is in the affirmative, and the second target data to be restored to the secure processing device.

Furthermore, the present invention may be a control program for controlling an operation of a secure processing device that switches between a normal power mode and a power saving mode, and performs processing using target data in the normal power mode, the target data being data to be treated confidentially, wherein the secure processing device comprises: a secure storage unit having a first memory that is to be protected from unauthorized access from outside, the first memory holding first target data in the normal power mode and losing the first target data in the power saving mode; a protection storage unit having a second memory that is to be protected from the unauthorized access from outside, the second memory holding data both in the power saving mode and the normal power mode, a size of the second memory being smaller than a size of the first memory, and the control program comprises the steps of: encrypting the first target data to generate ciphertext during a first switching process, and decrypting the ciphertext to generate second target data during a second switching process, the first switching process being switching from the normal power mode to the power saving mode, and the second switching process being switching from the power saving mode to the normal power mode; generating an authentication code based on the target data during the first switching process, a size of the authentication code being smaller than the target data; during the first switching process, causing (i) the target data to be encrypted in the encryption step, (ii) the ciphertext to be stored in the external memory, (iii) a first authentication code to be generated in the generation step, based on the ciphertext, and (iv) the first authentication code to be stored in the protection storage unit; during the second switching process, causing a second authentication code to be generated in the generation step, based on the ciphertext stored in the external memory; judging whether or not the second authentication code is identical with the first authentication code; limiting a process for restoring the ciphertext to the secure storage unit when the judgment is in the negative, and, causing the ciphertext to be decrypted in the encryption step when the judgment is in the affirmative, and the second target data to be restored to the secure processing device.

With the stated structure, the control program as described above is distributed via a network and such.

DESCRIPTION OF CHARACTERS

Figure 1:
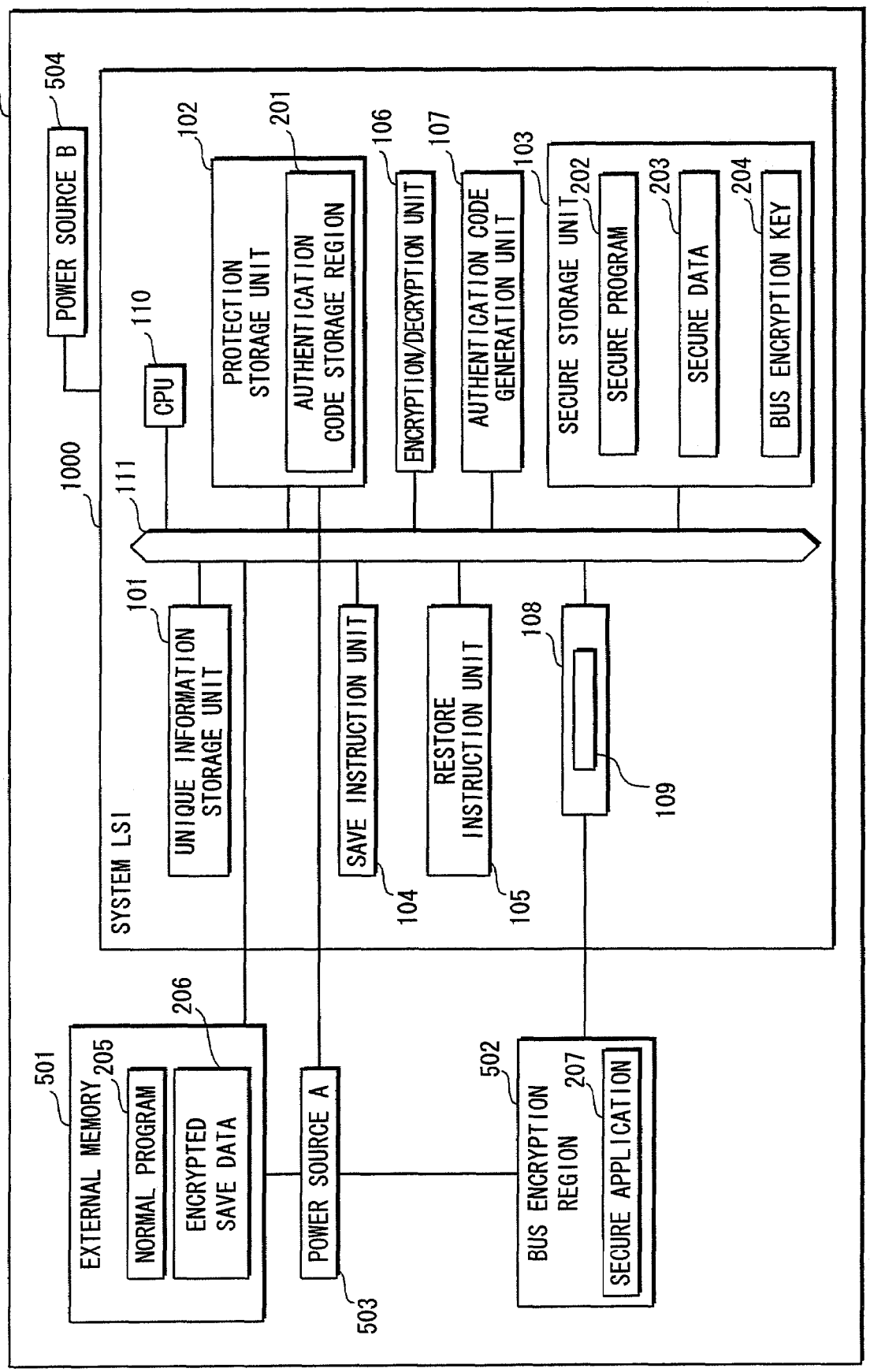
FIG. 1 is a functional block diagram showing a hardware configuration of a built-in apparatus 1.

| | |
|---|---|
| 1 | built-in apparatus |
| 101 | unique information storage unit |
| 102 | protection storage unit |
| 103 | secure storage unit |
| 104 | save instruction unit |
| 105 | restore instruction unit |
| 106 | encryption/decryption unit |
| 107 | authentication code generation unit |
| 108 | bus encryption circuit |
| 109 | bus encryption key storage register |
| 110 | CPU |
| 111 | internal bus |
| 501 | external memory |
| 502 | bus encryption region |
| 503 | power source A |
| 502 | power source B |
| 1000 | system LSI |

BEST MODE FOR CARRYING OUT THE INVENTION 1.1 General Outline

The following describes one embodiment of a secure processing device of the present invention.

1.1.1. General Outline of Secure Processing Device

In the present embodiment, the description is provided, based on the assumption that the secure processing device is a system LSI 1000 included in a built-in apparatus 1. In the system LSI 1000, at least components that perform processes related to target data that needs to be confidential have a mechanism for preventing unauthorized access from outside.

1.1.2 General Outline of Built-in Apparatus 1

A built-in apparatus 1 is, for example, a portable device that plays music data and such. The portable device 1 plays music data in an audio file format, such as MP3 (MPEG-1 Audio Layer-3), AAC (Advanced Audio Coding), and WMA (Windows (registered trademark) Media Audio). The music data is stored in an external flash memory such as an SD memory card.

The built-in apparatus 1 is compatible with SD-Audio, so as to enable the use of music data that takes into account the copyright protection. The SD-Audio is an SD application format for recording music data into an SD memory card with copyright protection.

The music data in the SD memory card is encrypted for copyright protection. Therefore, the encrypted music data needs to be decrypted before playback. The system LSI 1000 of the built-in apparatus 1 securely performs a process for playing the decrypted music data, so that the decrypted music data is protected from unauthorized duplication and the like.

1.1.3 General Outline of System LSI 1000

The system LSI 1000 includes a secure storage unit 103 for processes using the target data that needs to be confidential.

The system LSI 1000 operates by switching between a normal power mode and a power saving mode.

While operating in the power saving mode, the secure storage unit 103 of the system LSI 1000 does not receive any power supply. Therefore, the secure storage unit 103 loses the data stored therein. To avoid this situation, the system LSI 1000 saves the data stored in the secure storage unit 103 into an external memory 501 which is located outside the system LSI 1000, when switching to the power saving mode. Also, the system LSI 1000 securely restores the data saved in the external memory 501 to the secure storage unit 103, when switching from the power saving mode to the normal power mode.

The following is a detailed description of the system LSI 1000, which is one example of the secure processing device of the present invention that securely saves the data in the secure storage unit 103 into the external memory 501, and also securely restores the data saved in the external memory 501 to the secure storage unit 103.

1.2 Structure

First, the structures of the built-in apparatus 1 and the system LSI 1000 are specifically described.

FIG. 1 is a functional block diagram showing the hardware configuration of the built-in apparatus 1.

As shown in FIG. 1, the built-in apparatus 1 includes the system LSI 1000, the external memory 501, a bus encryption region 502, a power source A503, and a power source B504.

1.2.1 System LSI 1000

The system LSI 1000 includes a hardware configuration having a unique information storage unit 101, a protection storage unit 102, a secure storage unit 103, a save instruction unit 104, a restore instruction unit 105, an encryption/decryption unit 106, an authentication code generation unit 107, a bus encryption circuit 108, a bus encryption key storage register 109, and a CPU 110. The components of the system LSI 1000 are connected to an internal bus 111.

The above-described components of the system LSI 1000 are included inside the system LSI 1000, and have a mechanism for preventing unauthorized access from outside the system LSI 1000.

1.2.2 External Memory 501

The external memory 501 is a volatile memory provided outside the system LSI 1000, and stores (i) data having a lower degree of importance in terms of copyright protection and security and (ii) data to be saved from the system LSI 1000.

Data stored in the external memory 501 can be accessed by various apparatuses, since the external memory 501 does not have any mechanisms for preventing unauthorized access. Also, the external memory 501 is connected to the power source A503, as shown in FIG. 1. While the built-in apparatus 1 is in operation, power is supplied from the power source A503 to the external memory 501. Therefore, the data stored in the external memory 501 is not lost while the built-in apparatus 1 is in operation.

Specifically, the data stored in the external memory 501 includes, as shown in FIG. 1, a normal program 205 and saved data 206 that has been encrypted (referred to as "encrypted save data 206 hereinafter).

The normal program 205 is, for example, a program for controlling a process of the built-in apparatus 1 as a whole. The program is referred to and executed by the CPU 110 whenever necessary. The encrypted save data 206 is data to be saved from the system LSI 1000 to the external memory 501, while the system LSI 1000 is switching to the power saving mode. The data is encrypted by the encryption/decryption unit 106 of the system LSI 1000. The external memory 501 also stores data used for a process of the normal program 205.

The normal program 205 is not particularly important in terms of security, compared to music data and such that requires copyright protection. Also, the size of the normal program 205 is comparatively large, since the program is for controlling the operation of the built-in apparatus 1 as a whole. Therefore, the normal program 205 is stored in the external memory 501, instead of the secure storage unit 103.

It is preferable that the encrypted save data 206 is immediately deleted from the external memory 501 after the system LSI 1000 has switched from the power saving mode to the normal power mode, to ensure higher security.

1.2.3 Bus Encryption Region 502

The bus encryption region 502 is a volatile memory provided outside the system LSI 1000, and stores data having a higher degree of importance in terms of copyright protection and security. As shown in FIG. 1, the bus encryption region 502 is connected to the power source A503 to receive the power supply therefrom. Therefore, the data in the bus encryption region 502 is not lost while the built-in apparatus 1 is in operation.

The bus encryption region 502 is used to securely store data outside the system LSI 1000. The data to be stored in the bus encryption region 502 is data that cannot be stored in the secure storage unit 103 of the system LSI 1000, because of a problem such as the capacity of the secure storage unit 103 being too small. The bus encryption region 502 can be accessed by various apparatuses. Therefore, the bus encryption region 502 stores data encrypted by the bus encryption circuit 108, so as to securely hold the data. A key used by the bus encryption circuit 108 for encryption is called "bus encryption key".

In the present embodiment, the bus encryption region 502 stores a secure application 207 and such, as shown in FIG. 1. The secure application 207 is encrypted by the bus encryption circuit 108. The secure application 207 is a program for protecting copyright. Specifically, the secure application 207 is used for the secure performance of a process that uses the copyright information of music data, a process that uses a decryption key for decrypting the music data, and such.

The secure application 207 stored in the bus encryption region 502 is read by the CPU 110, and decrypted with use of the bus encryption key in the bus encryption circuit 108. The CPU 110 performs a process for realizing the above-described copyright protection, by executing the decrypted secure application.

1.2.4 Power Source A503

As shown in FIG. 1, the power source A503 keeps supplying power to the external memory 501, the bus encryption region 502, and the protection storage unit 102 in the system LSI 1000. The power source A503 is implemented in a battery or such. The power source A503 supplies power to the above-described external memory 501, bus encryption region 502, and protection storage unit 102, whether the system LSI 1000 is in the power saving mode or in the normal power mode.

1.2.5 Power Source B504

As shown in FIG. 1, the power source B504 supplies power to the system LSI 1000. Note here that the power source B504 supplies power only when the system LSI 1000 is operating in the normal power mode, and does not supply power when the system LSI 1000 is operating in the power saving mode. The power B504 is implemented in an external battery of the built-in apparatus 1 or such.

Note that the power A503 is for supplying power to the external memory and such, so that predetermined data is stored in the memory while the system LSI 1000 is operating in the power saving mode. The power supplied from the power source A503 to the external memory and such is smaller than the power supplied from the power source B504 to the system LSI that includes the CPU 110 and executes a program and such. Therefore, the capacity of the power source A503 is generally smaller than that of the power source B504, and implemented in an unremovable battery such as a condenser.

1.2.6 Unique Information Storage Unit 101

The following describes each of the components included inside the system LSI 1000.

The unique information storage unit 101 stores unique information that is unique to the system LSI 1000. The unique information may be an identifier (ID) for identifying the system LSI 1000.

It is preferable that the unique information storage unit 101 is realized in a manner that the unique information stored therein is difficult to delete or rewrite. For example, the unique information storage unit 101 may be a mask ROM (Read Only Memory) or a fuse PROM.

1.2.7 Protection Storage Unit 102

The protection storage unit 102 includes an authentication code storage region 201 for storing an authentication code that is generated by the authentication code generation unit 107. The descriptions of the authentication code and the authentication code generation unit 107 are provided below.

The protection storage unit 102 is, for example, a volatile memory, and connected to the power source A503, as shown in FIG. 1. The protection storage unit 102 does not lose data stored therein, whether or not the secure processing device is operating in the power saving mode. This is because the protection storage unit 102 receives power supplied by the power source A503. Also, the protection storage unit 102 is accessible only by an instruction code included in a program stored in either the secure storage unit 103 or the bus encryption region 502, and protected from unauthorized access from outside.

The size of the data of the authentication code is smaller than that of data stored in the secure storage unit 103. Therefore, the capacity of the protection storage unit 102 is smaller than that of the below-described secure storage unit 103. For example, the capacity of the protection storage unit 102 is in a range of $1/1000$ to $1/100$ of the capacity of the secure storage unit 103. Therefore, a memory region necessary for the protection storage unit 102 is smaller than the secure storage unit 103.

1.2.8 Secure Storage Unit 103

The secure storage unit 103 is a memory used by the CPU 110 to perform processes including a process of the target data that needs to be confidential.

The secure storage unit 103 is a volatile memory and has a hardware configuration in which access from outside the system LSI 1000 is prohibited.

Such a hardware configuration can be realized, for example, by the CPU 110 that operates by switching between a normal mode and a secure mode, and the secure storage unit 103. Specifically, the secure storage unit 103 may be a memory space that is physically separated, and cannot be accessed from outside the system LSI 1000. The secure storage unit 103 can be accessed only by the CPU 110 that is operating in the secure mode.

Note that in the present embodiment, data whose confidentiality needs to be guaranteed is stored in the secure storage unit 103, since the exposure of such data is disadvantageous to the copyright owner of the data and the like. Specifically, the secure storage unit 103 stores secure programs 202, secure data 203, and a bus encryption key 204, as shown in FIG. 1.

Here, the secure programs 202 are for controlling the processing of the system LSI 1000. For example, the secure programs 202 includes a program for decrypting and playing music data that is encrypted for copyright protection, and a program for performing a process for saving data stored in the secure storage unit 103 into the external memory 501, when the system LSI is switching to the power saving mode. Note that among the secure programs 202, the program for performing the process for saving the data stored in the secure storage unit 103 into the external memory 501, when switching to the power saving mode, is preliminarily stored in a nonvolatile ROM (Read Only Memory) inside the system LSI 1000. Then, when the system LSI 1000 starts operating, the program is read from the ROM and stored into the secure storage unit 103 as one of the secure programs 202. The ROM is included inside the system LSI 1000, and thereby protected from unauthorized access from outside the system LSI 1000. Also, the secure data 203 is, for example, music data that is not encrypted.

When the secure program 202 is exposed, an unauthorized person may tamper with the secure program 202 to create a program that allows unauthorized process, such as a process of disabling the restriction on the playback count of music data. Also, the exposure of the secure data 203 may result in the secure data 203 being duplicated in an unauthorized manner. Therefore, the confidentiality of the secure program 202 and the secure data 203 must be guaranteed.

A detailed description of the bus encryption key 204 is provided below, together with descriptions of the bus encryption circuit 108 and the bus encryption key storage register 109.

As described above, the secure storage unit 103 has a hardware configuration that prevents access from outside. Therefore, data stored in the secure storage unit 103 remains confidential. The unique information storage unit 101, and the protection storage unit 102 also have the same hardware configuration as the secure storage unit 103, and cannot be accessed from outside.

Also, while the system LSI 1000 is operating in the power saving mode, the secure storage unit 103 does not receive any power supply. Therefore, the secure storage unit 103 loses data stored therein.

1.2.9 Save Instruction Unit 104

The save instruction unit 104 detects the timing of when the system LSI 1000 needs to switch from the normal power mode to the power saving mode. Upon detection, the save instruction unit 104 instructs the CPU 110 to save data stored in the secure storage unit 103 into the external memory 501.

Note here that the built-in apparatus 1 has a detection mechanism for detecting that the operation of a user has been performed. For example, the built-in apparatus 1 detects the operation of the user when an operation member (not shown in figures) is pressed by the user, or when the built-in apparatus 1 receives a signal indicating an instruction of the operation. The built-in apparatus 1 causes the LSI 1000 to switch from the normal power mode to the power saving mode, when not having detected the operation of the user for more than a certain period of time. The built-in apparatus 1 causes the system LSI 1000 to switch from the power saving mode back to the normal power mode when detecting the operation of the user.

Specifically, when the system LSI 1000 is operating in the normal power mode and the operation of the user has not been detected for more than a certain period of time, the built-in apparatus 1 outputs a switch control signal to the save instruction unit 104. The switch control signal is a signal for switching the operation mode of the system LSI 1000 to the power saving mode. Upon receiving the switch control signal, the save instruction unit 104 detects that the system LSI 1000 needs to switch from the normal power mode to the power saving mode.

When the detection mechanism of the built-in apparatus 1 receives the operation of the user while the system LSI 1000 is operating in the power saving mode, the built-in apparatus 1 causes the power source B 504 to supply power to the system LSI 1000, so that the system LSI 1000 switches back to the normal power mode. When the power supply to the system LSI 1000 has been resumed, the built-in apparatus 1 outputs a restore control signal to the restore instruction unit 105.

1.2.10 Restore Instruction Unit 105

The restore instruction unit 105 detects that the system LSI 1000 needs to switch from the power saving mode to the normal power mode by receiving the restore control signal. Upon detection, the restore instruction unit 105 instructs the CPU 110 to perform an operation to securely restore data saved in the external memory 501 to the secure storage unit 103.

Specifically, the system LSI 1000 stores a restoration program that is for securely restoring data saved in the external memory 501 to the secure storage unit 103. This restoration program is stored, for example, in a nonvolatile memory having a mechanism to prevent unauthorized access from outside the system LSI 1000. Therefore, the restoration program is not lost even while the system LSI 1000 is operating in the power saving mode.

The following describes a process of switching the operation mode of the system LSI 1000 to the normal power mode. When power supplied from the power source B504 to the system LSI 1000 is resumed and the restore instruction unit 105 receives the restore control signal, the restore instruction unit 105 reads the restoration program from the memory, and stores the read restoration program in the secure storage unit 103. Then, the restore instruction unit 105 instructs the CPU 110 to start the execution of the restoration program stored in the secure storage unit 103.

A description of a process of securely restoring data saved in the external memory 501 to the secure storage unit 103 is described below. Also, it is preferable that the restoration program is protected from unauthorized tampering. When the restoration program is tampered with, some processes such as authentication may be omitted. This may threaten the secure performance of the process of restoring data saved in the external memory 501 to the secure storage unit 103.

1.2.11 Encryption/Decryption Unit 106

The encryption/decryption unit 106 encrypts and decrypts data that is input and programs, according to the instruction of the CPU 110. The encryption/decryption unit 106 has a mechanism for preventing unauthorized access from outside the system LSI 1000. Therefore, an unauthorized person who does not have the authority to access the system LSI 1000 cannot acquire a key used by the encryption/decryption unit 106 to perform encryption and decryption, intermediate data that is data during the encryption or the decryption, and the like.

Examples of algorithms used for encryption and decryption include AES (Advanced Encryption Standard) in a symmetric key encryption method, and RSA (Rivest Shamir Adleman) in a public key encryption method. However, the algorithms are not limited to such.

1.2.12 Authentication Code Generation Unit 107

The authentication code generation unit 107 generates authentication codes from data that is input and programs, according to an instruction given by the CPU 110. Here, the authentication codes are digest values of data that is input and programs.

The authentication code is used to judge whether or not two pieces of data are identical. One of the two is data that is to be saved in the external memory 501 while the system LSI 1000 is switching to the power saving mode. The other of the two is data that is to be restored to the secure storage unit 103, when the system LSI 1000 switches back to the normal power mode.

Therefore, the authentication generation unit 107 needs to generate values that are at least dependent on the data that is input or the programs. Preferably, the authentication code generation 107 needs to generate values that are each obtained uniquely. Also, the authentication code generation unit 107 preferably generates the authentication code in a manner that it is difficult to generate different data that has the same value of the authentication code as certain data. Furthermore, it is preferable that the authentication code generation unit 107 does not generate an authentication code having a value close to the authentication code of similar data. Also, the generated values of the authentication codes are preferably not lopsided.

Therefore, in the present embodiment, the authentication code generation unit 107 calculates the hash values of the input data and programs to generate the authentication codes. The calculated hash values are provided as the authentication codes. An algorithm used for calculating the hash values is, for example, SHA-1. However, it is not limited to such.

1.2.13 Bus Encryption Circuit 108

The bus encryption circuit 108 includes the bus encryption key storage register 109. The bus encryption key storage register 109 is a register that stores the bus encryption key. The bus encryption key is determined by the CPU 110 executing the secure program 202 stored in the secure storage unit 103. The bus encryption circuit 108 first encrypts programs and data that are to be written in the bus encryption region 502, with use of the bus encryption key that is stored in the bus encryption storage register 109. Then, the bus encryption circuit 108 sets each of the encrypted programs and data to be the secure application 207, D and stores the secure application 207 in the bus encryption region 502. Also, the bus encryption circuit 108 reads the encrypted programs and data stored in the bus encryption region 502, and decrypts the encrypted programs and data with use of the bus encryption keys.

Note that the encrypted data is stored in the bus encryption region 502, which can be accessed by various apparatuses. Therefore, if the bus encryption key used for the encryption is fixed, the bus encryption key may be exposed by analyzing data stored in the bus encryption region 502. Therefore, it is preferable that the bus encryption key is changed whenever necessary. When the bus encryption key is changed, the bus encryption circuit 108 updates the content of the bus encryption key storage register 109.

Note that the bus encryption key stored in the bus encryption key storage register 109 is also stored in the secure storage unit 103 as the bus encryption key 204. Every time the bus encryption key is changed, the bus encryption key storage register 109 and the secure storage unit 103 are overwritten with the new bus encryption keys.

There are many possibilities regarding the timing of changing the bus encryption key. For example, the bus encryption key can be changed when the built-in apparatus 1 is turned on, or when the secure program 202 starts operating. At this point, the bus encryption key may be generated as the initial operation of the secure program 202, by using the starting time of the execution of the secure program 202 and such.

Also, the bus encryption circuit 108, the bus encryption key storage register 109 that stores the bus encryption key, and such are included inside the system LSI 1000, and cannot be accessed from outside the system LSI 1000 in unauthorized manner. The encrypted data stored in the bus encryption region 502 is read by the system LSI 1000, and decrypted only inside the system LSI 1000. Therefore, only the system LSI 1000 can use the data obtained by the decryption.

1.2.14 CPU 110

The CPU 110 controls the operation of the system LSI 1000, according to programs stored in the secure storage unit 103, the bus encryption region 502, the external memory 501, and such.

The CPU 110 has two operation modes, namely the normal mode and the secure mode, and operates by switching between the normal mode and the secure mode. The CPU 110 can access the memories in the system LSI 1000 only while operating in the secure mode. Here, the memories in the system LSI 1000 include the secure storage unit 103, the protection storage unit 102, and the unique information storage unit 101. Also, only while operating in the secure mode, the CPU 110 causes the encryption/decryption unit 106 and the bus encryption circuit 108 to perform an operation related to data whose confidentiality needs to be guaranteed. In other words, when a process related to data whose confidentiality needs to be protected can be performed, the components in the system LSI 1000 is accessible only for a period in which the CPU 110 is operating in the secure mode. In this way, the system LSI 1000 prevents unauthorized access from outside.

For example, the CPU 110 performs the following processes: (i) reading encrypted music data from an SD memory card, decrypting the encrypted music data, and play the decrypted music data, after switching the operation mode to the secure mode; (ii) securely saving data and such stored in the secure storage unit 103 into the external memory 501, when the secure processing device switches to the power saving mode; (iii) securely restoring data saved in the external memory 501 to the secure storage unit 103, when the secure processing device switches to the normal power mode.

1.2.15 Internal Bus 111

As shown in FIG. 1, the internal bus 111 connects the components inside the system LSI 1000 to each other.

1.2.16 Other Components

Note that the built-in apparatus 1 further includes, for example, an operation receiving unit for receiving the operation of a user, and an interface for inserting and removing a flash memory such as an SD memory. However, such components are not part of the features of the present invention. Therefore, such components are not shown in figures, and descriptions thereof are omitted.

1.3 Operation

The following describes the operation of the secure processing device of the present invention.

"1.3.1 Process of Playing Music Data" describes a process in which the system LSI 1000 securely plays music data.

"1.3.2 Process of Switching Power Modes", "1.3.3 Process of Saving", and "1.3.4 Process of Restoring" describe (i) a process in which the system LSI 1000 securely saves, while switching to the power saving mode, data and such stored in the secure storage unit 103 into the external memory 501, and (ii) a process in which the system LSI 1000 securely restores, while switching to the normal power mode, the data saved in the external memory 501 to the secure storage unit 103.

1.3.1 Process of Playing Music Data

The following describes a process in which the system LSI 1000 of the built-in apparatus 1 securely plays music data. Note here that the music data is encrypted and stored in an SD memory card.

The system LSI 1000 uses the secure application 207 stored in the bus encryption region 502 to acquire the encrypted music data stored in the SD memory card. Also, the system LSI 1000 uses the secure program 202 to decrypt the encrypted music data to obtain decrypted music data, and store the decrypted music data in the secure storage unit 103. The secure program 202 is also used when playing the decrypted music data stored in the secure storage unit 103.

Specifically, upon receipt of an instruction for playing music data from a user, the built-in apparatus 1 causes the system LSI 1000 to start the process of playing the music data.

Figure 2:
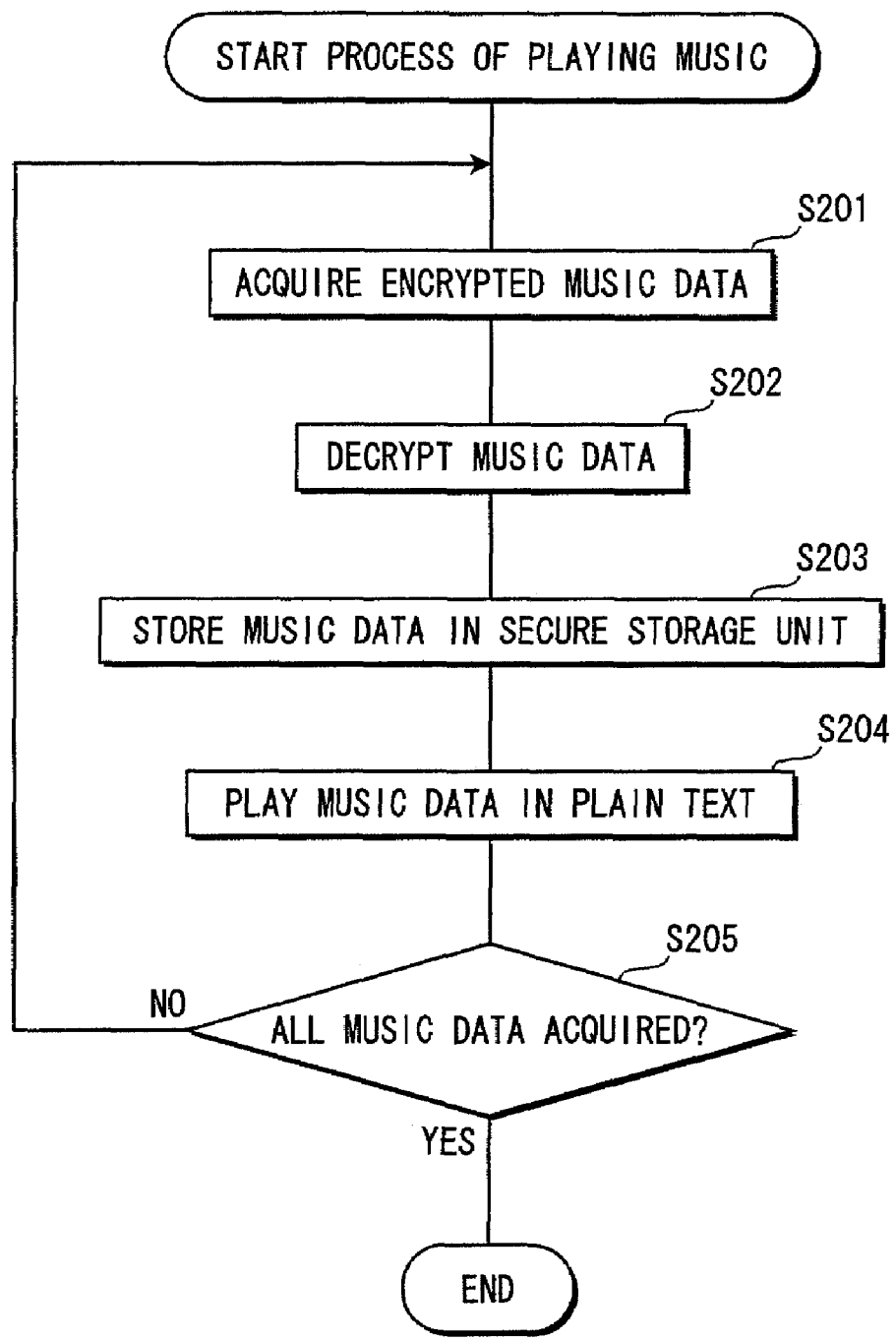
FIG. 2 is a flow chart showing a process in which a system LSI 1000 of the built-in apparatus 1 securely plays music data.

FIG. 2 is a flow chart showing a process in which the system LSI 1000 of the built-in apparatus 1 securely plays music data.

As shown in FIG. 2, the CPU 110 of the system LSI 1000 acquires the encrypted music data from the SD memory card connected to the built-in apparatus 1, by executing the secure application 207 stored in the bus encryption region 502 (step S201).

After reading the secure program 202 from the secure storage unit 103, the CPU 110 executes the secure program 202 and thereby calculates a decryption key for decrypting the encrypted music data. Then, the CPU 110 decrypts the encrypted music data, using the calculated decryption key (step S202). Note that a method for calculating a decryption key for decrypting an encrypted content such as music data, has been widely used. Also, the method is not one of the features of the present invention. Therefore, a detailed description of the method is omitted.

The CPU 110 stores, in the secure storage unit 103, music data that has been decrypted by executing the secure program 202 (step S203).

The CPU 110 plays music data in plaintext that has been decrypted and stored in the secure storage unit 103 (step S204).

The CPU 110 judges whether or not all the music data has been acquired from the SD memory card (step S205). If judging affirmatively (step S205:YES), the CPU 110 ends the process of playing music data. If judging negatively (step S205: NO), the CPU 110 returns to the process of step S201, and repeats the processes of acquiring, decrypting, and playing music data (step S201, S202, S203, and S204).

1.3.2 Process of Switching Power Modes

Figure 3:
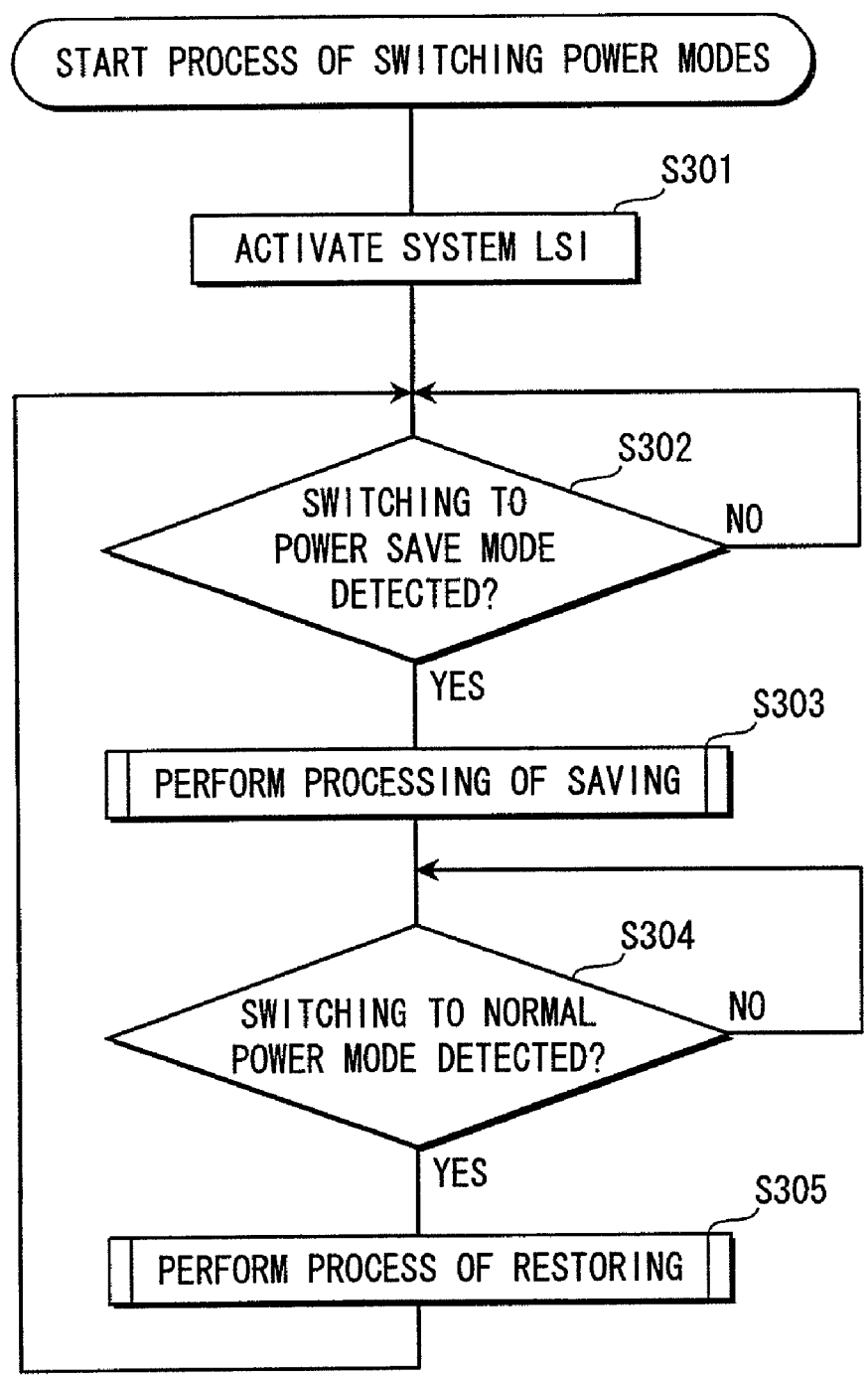
FIG. 3 is a flow chart showing an outline of a process in which the system LSI 1000 controls the switching between a power saving mode and a normal power mode.

FIG. 3 is a flow chart showing an outline of a process in which the system LSI 1000 controls the switching between the power saving mode and the normal power mode.

When the built-in apparatus 1 starts operating and the system LSI 1000 is activated (step S301), the system LSI 1000 first starts operating in the normal power mode.

When having started the operation, the CPU 110 of the system LSI 1000 stores, in the secure storage unit 103, a program that is for executing a process of saving data stored in the secure storage unit 103 into the external memory 501 while the operation mode is switched to the power saving mode. The program stored in the secure storage unit 103 is referred to as the secure program 202.

The system LSI 1000 operates in the normal power mode until the save instruction unit 104 detects that the operation mode needs to be switched to the power saving mode (step S302: NO).

When detecting that the operation mode needs to be switched to the power saving mode (step S302:YES), the save instruction unit 104 instructs the CPU 110 to save data stored in the secure storage unit 103 into the external memory 501.

Upon receipt of the instruction from the save instruction unit 104, the CPU 110 performs the process of securely saving data stored in the secure storage unit 103 into the external memory 501 (step S303). This process of step S303 is referred to as a "process of saving" hereinafter. A detailed description of the process of saving is provided in the "1.3.3 Process of Saving". After the process of saving, the system LSI 1000 operates in the power saving mode.

The system LSI 1000 operates in the power saving mode, until the restore instruction unit 105 detects that the operation mode needs to be switched to the normal power mode (step S304: NO).

When detecting that the operation mode needs to be switched to the normal power mode (step S304: YES), the restore instruction unit 105 reads, from the nonvolatile memory in the system LSI 1000, a restoration program that is for securely restoring data saved in the external memory 501 to the secure storage unit 103, and stores the restoration program in the secure storage unit 103. The restore instruction unit 105 instructs the CPU 110 to execute the restoration program stored in the secure storage unit 103.

Upon receipt of the instruction from the restore instruction unit 105, the CPU 110 performs a process of securely restore the data saved in the external memory 501 to the secure storage unit 103 (step S305). The process of step S305 is referred to as a "Process of Restoring" hereinafter. A detailed description of the process of restoring is provided in the "1.3.4 Process of Restoring". After the process of restoring, the system LSI 1000 operates in the normal power mode, and performs the process of step S302.

1.3.3 Process of Saving

A detailed description is provided of the process of saving data in step S303.

Figure 4:
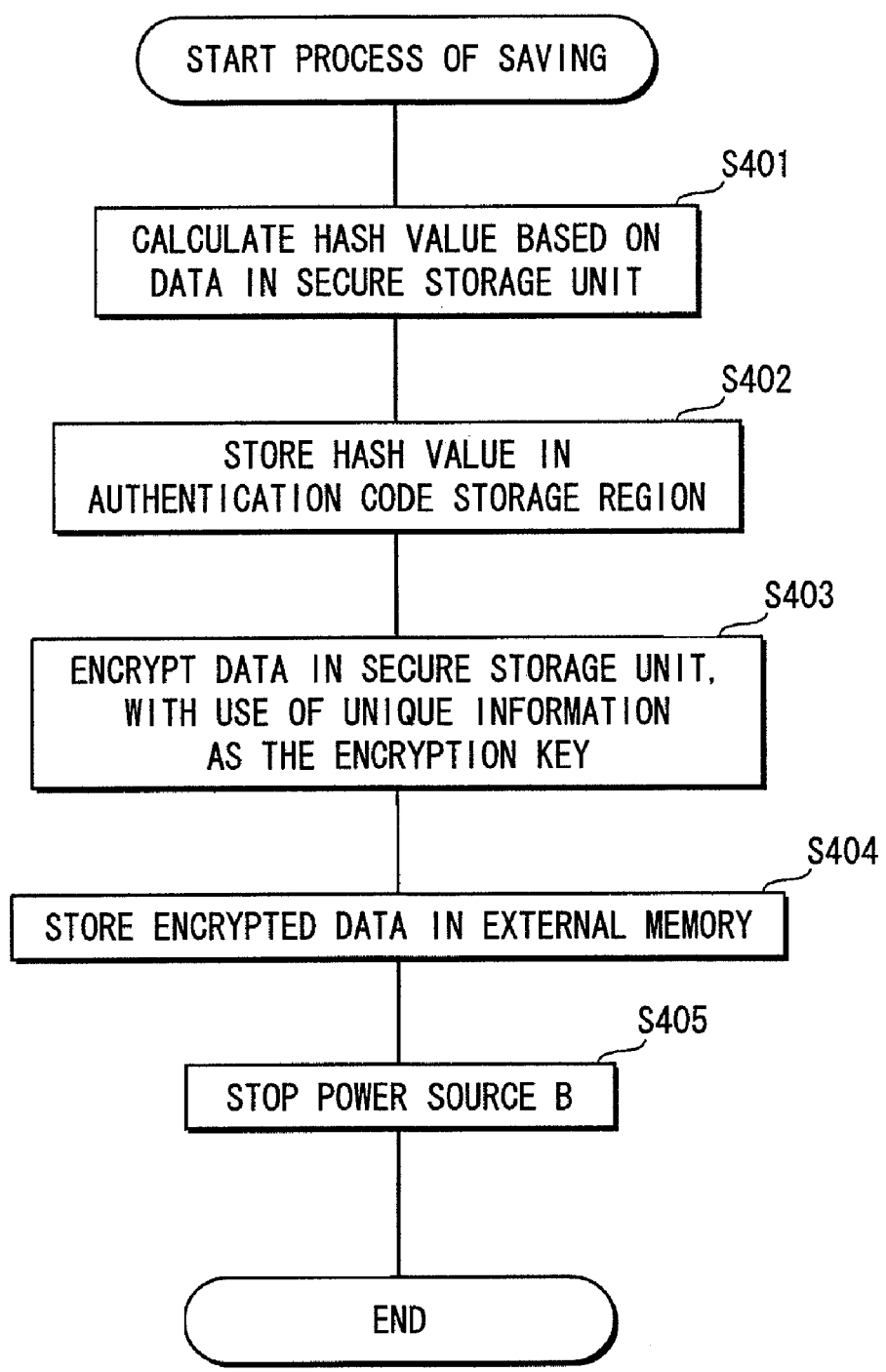
FIG. 4 is a flow chart showing a process in which a CPU 110 securely saves data stored in a secure storage unit 103 into an external memory 501.

FIG. 4 is a flow chart showing a process in which the CPU 110 securely saves data stored in the secure storage unit 103 into the external memory 501.

The following describes a process performed after the CPU 110 receives the instruction from the save instruction unit 104.

The CPU 110 causes the authentication code generation unit 107 to calculate a hash value, based on input data that is a whole data stored in the secure storage unit 103 (step S401). The input data includes, for example, the secure program 202, the secure data 203, and the bus encryption key 204.

The CPU 110 stores the hash value obtained by the calculation in the authentication storage region 201 of the protection storage unit 102 (step S402).

The CPU 110 causes the encryption/decryption unit 106 to encrypt the whole data stored in the secure storage unit 103, with use of an encryption key that is the unique information stored in the unique information storage unit 101 (step S403).

After the data has been encrypted, the CPU 110 saves the data into the external memory 501 as the encrypted save data 206 (step S404).

After completing the process of step S404, the CPU 110 terminates power supplied by the power source B504 (step s405). In this way, power supplied to the system LSI 1000 stops, and the process of saving is completed.

1.3.4 Process of Restoring

A detailed description is provided of the process of restoring in step S305.

Figure 5:
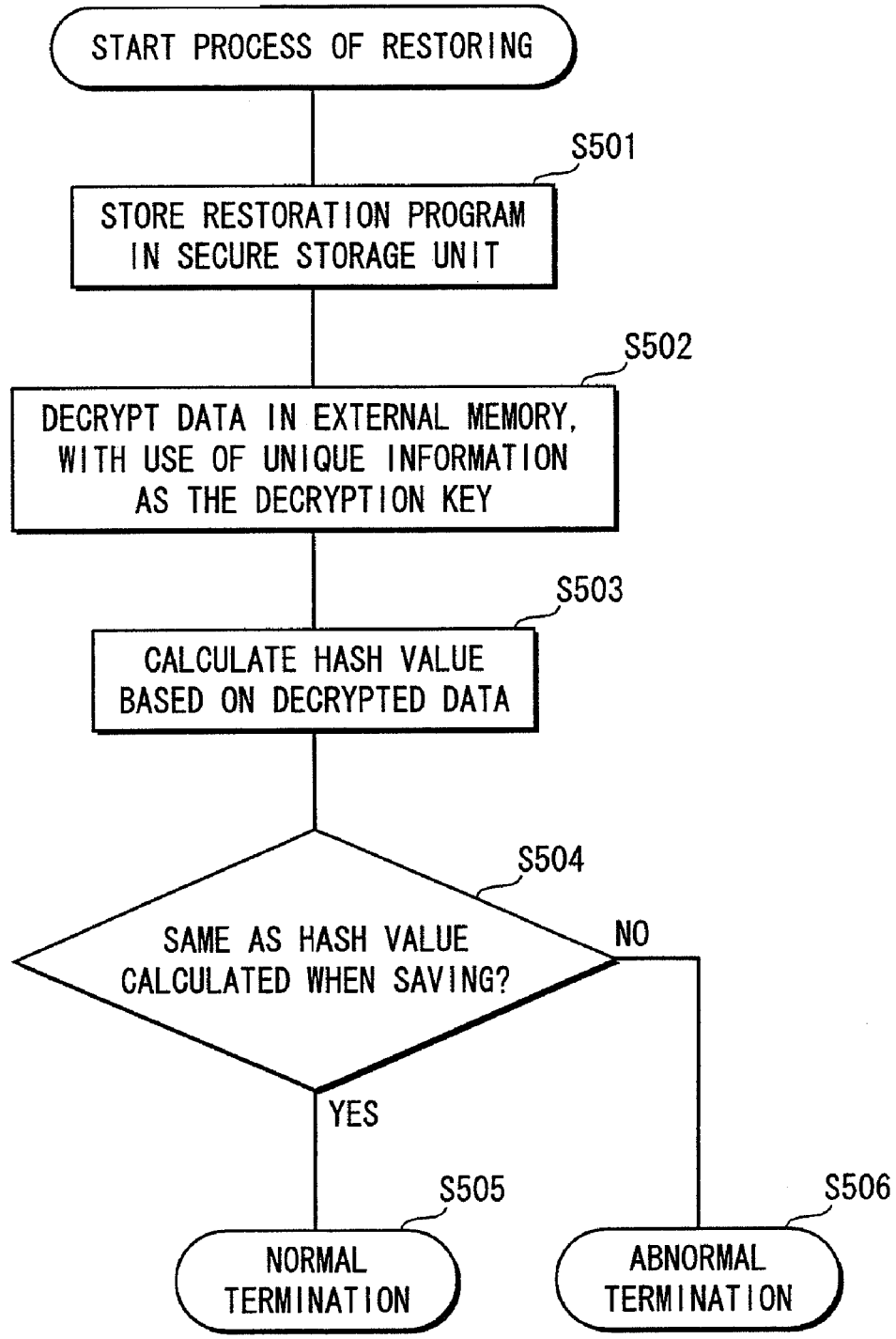
FIG. 5 is a flow chart showing a process in which the CPU 110 securely restores the data saved in the external memory 501 to the secure storage unit 103.

FIG. 5 is a flow chart showing a process in which the CPU 110 securely restores the data saved in the external memory 501 to the secure storage unit 103.

The following describes the process of the step S304, namely a process performed after the restore instruction unit 105 has detected that the system LSI 1000 needs to switch back to the normal power mode. Note that, as explained above in the description of the save instruction unit 104, power supplied from the power source B504 to the system LSI 1000 is resumed by the built-in apparatus 1, when the restore instruction unit 105 performs the detection.

As explained above in the description of the restore instruction unit 105, after performing the detection, the restore instruction unit 105 reads the restoration program from the memory, and stores the read restoration program into the secure storage unit 103 (step S501). The restore instruction unit 105 instructs the CPU 110 to start executing the restoration program.

Upon receipt of the instruction from the restore instruction unit 105, the CPU 110 executes the restoration program. The following describes a process performed in accordance with the restoration program. First, the CPU 110 reads the encrypted save data stored in the external memory 501. After completing the reading, the CPU 110 causes the encryption/decryption unit 106 to decrypt the encrypted save data 206, with use of a decryption key that is the unique information stored in the unique information storage unit 101 (step S502).

The CPU 110 causes the authentication code generation unit 107 to calculate a hash value, based on input data that is data obtained by the decryption (step S503).

The CPU 110 judges whether the hash value obtained by the calculation is identical with the hash value stored in the authentication code storage region 201 of the protection storage unit 102, by comparing the hash values (step S504).

When judging that the hash values are identical (step S504: YES), the CPU 110 ends the process of restoring in a normal manner (step S505).

When judging that the hash values are different (step S504: NO), the CPU 110 ends the process of the restoring in an abnormal manner (step S506), since it is possible that the encrypted save data 206 is tampered with. At this point, the CPU 110 discards the data decrypted in step S502.

1.3.5 Supplementary Remarks on Operation (1) Supplementary Remarks on Bus Encryption Key In the above-described embodiment, the bus encryption key stored in the bus encryption key storage register 109 is also stored in the secure storage unit 103. When the system LSI 1000 switches to the power saving mode, the bus encryption key 204 stored in the secure storage unit 103 is also encrypted and stored in the external memory 501.

The following provides some supplementary remarks about saving the bus encryption key.

As described above, data stored in the bus encryption region 502 is encrypted with use of the bus encryption key. Also, as described above, it is preferable that the bus encryption key is changed whenever necessary.

Assume here that the bus encryption key is changed whenever necessary. In this case, if the system LSI 1000 loses the bus encryption key when switching to the power saving mode, the system LSI 1000 cannot use the data in the bus encryption region 502 after switching back to the normal power mode, due to the loss of the original bus encryption key. Therefore, in order to continue a process that uses the data in the bus encryption region 502 after switching back to the normal power mode, the system LSI 1000 again needs to perform a process such as storing the data. In other words, the system LSI 1000 is forced to end the process that uses the data in the bus encryption region 502, being unable to continuously perform the process before switching to the power saving mode and after switching back to the normal power mode.

Therefore, as seen in the above-described embodiment, the bus encryption key is also saved in the external memory 501. In this way, although switching between the power saving mode and the normal power mode, the system LSI 1000 can resume the process that uses the data in the bus encryption region 502.

The bus encryption key is also saved in the secure storage unit 103. However, the bus encryption key does not always need to be stored in the secure storage unit 103. The saving of the bus encryption key is possible by reading the bus encryption key from the bus encryption key storage register 109 when the operation mode switches to the power saving mode.

However, when the bus encryption key 204 is stored in the secure storage unit 103, the system LSI 1000 does not need to read the bus encryption key 204 from the bus encryption key storage register 109 when switching to the power saving mode. Therefore, it is advantageous since data can be saved into the external memory 501 at high speed.

Furthermore, in a case where power supplied to the system LSI decreases during the process of saving data, it is possible to minimize the risk of losing the data which may be caused by the power supply being stopped before all the data has been saved.

Also, the above embodiment describes one bus encryption circuit 108. However, in a case where a plurality of secure applications 207 are stored in the bus encryption region 502, it is preferable from the security reasons that encryption and decryption is performed with use of a key that is different for each of the secure applications. This is because even if a certain bus encryption key were to be exposed by unauthorized analysis and such, the secure applications 207 that use other bus encryption keys are not affected by the exposure.

In other words, the number of bus encryption circuits 108 may be more than one, so that each of the secure applications 207 corresponds to a different one of the pairs of the bus encryption circuits 108 and the bus encryption key storage registers 109. It is also possible that the number of the bus encryption key storage registers 109 is more than one.

In this case, the plurality of bus encryption keys may be stored in the secure storage unit 103 with a series of memory addresses. This makes it possible, when saving data to the external memory 501, to complete the process of saving the bus encryption keys faster than a case of reading each of the bus encryption keys from the respective bus encryption key storage registers 109. This is because the bus encryption keys stored in the bus encryption key storage registers 109 are arranged randomly in a virtual memory space when viewed from the system LSI 1000. As a result, the system LSI 1000 needs to search for the bus encryption keys.

(2) Supplementary Remarks on Encryption Using Unique Information

In the above-described embodiment, data to be saved in the external memory 501 is encrypted with use of an encryption key that is the unique information that is unique to the system LSI 1000.

In this way, the unique information is different for each system LSI 1000, which means that the encryption key used for the encryption is different for each system LSI 1000. As a result, data encrypted by a certain system LSI 1000 cannot be decrypted by other system LSIs 1000.

(3) Supplementary Remarks on Process of Playing Music Data

In FIG. 2 that shows the process of playing music data, the steps S201, S202, and S203 are performed only by the components inside the system LSI 1000, namely the components that are protected from unauthorized access from outside the system LSI 1000. This makes it possible to securely perform the process of playing music data.

Also, a decryption key for decrypting music data that has been encrypted may be stored in a memory card with the encrypted music data. Here, the decryption key is preferably encrypted to prevent the decryption key from being used in an unauthorized manner.

1.3.6 Variation of Operations (1) Variation of Timing for Calculation of Hash Values In the above-described embodiment, the timing for the authentication code generation unit 107 to calculate a hash value when switching to the power saving mode is before the encryption/decryption unit 106 encrypts data stored in the secure storage unit 103. In other words, the authentication code generation unit 107 calculates the hash value based on data in plain text.

Alternately, data in plain text stored in the secure storage unit 103 may be encrypted by the encryption/decryption unit 106 first. Then, based on the encrypted data, the authentication generation unit 107 may calculate a hash value. In this case, when switching back to the normal power mode, the CPU 110 first reads the encrypted save data 206 from the external memory 501. Then, based on the encrypted save data 206, the authentication code generation unit 107 calculates a hash value. If the calculated hash value is identical with a hash value that is calculated when switching to the power saving mode, the secure processing device causes the encryption/decryption unit 106 to decrypt the encrypted save data 206, restores the decrypted data to the secure storage unit 103, and completes the process of restoring in a normal manner. If the hash values are not identical, the secure processing device does not cause the encryption/decryption unit 106 to decrypt the encrypted save data 206, and ends the process of restoring in an abnormal manner.

With the above-described structure, whether or not the encrypted save data 206 has been tampered with is determined before performing a decryption process which causes high load. Therefore, the tamper check is performed quickly.

Note here that a method of calculating a hash value based on data in plain text also has an advantageous effect, as described in the above embodiment.

As described in the above variation, in a case where a hash value is calculated based on the encrypted data, tampering may not be detected if the encrypted data in the external memory 501 is tampered with during a period that begins immediately after the data starts being written into the external memory 501 by being encrypted and ends when the hash value is calculated based on the encrypted data. This is because the hash value is calculated based on data that has been tampered with. Especially in a case where the capacity of the secure storage 103 is rather small, it may be difficult to perform a process of calculating a hash value while the encrypted data is being stored in the secure storage unit 103.

Therefore, in the case of the above-described variation, it is preferable not to write the encrypted data into the external memory 501 until storing the hash value of the encrypted data into the authentication code storage region 201.

On the other hand, in the present embodiment described above, a process of storing a hash value into the authentication code storage region 201 after calculating the hash value is performed in the system LSI 1000. This makes it possible not to calculate a hash value based on data that has been tampered with.

(2) When Process of Restoring Ends in Abnormal Manner

Note that if a process of restoring ends in an abnormal manner (step S506), the operation of the system LSI 1000 may be terminated. Also, information indicating the abnormal termination may be notified or shown to the outside.

The above-described structure makes it possible to notify a copyright holder and the like that unauthorized tampering has been performed. Here, when the unique information of the system LSI 1000 is also notified to the outside, the copyright holder and the like can specify the built-in apparatus 1 that includes the system LSI 1000. As a result, the copyright holder and the like can take measures, such as prohibiting the playback of a content, against the built-in apparatus 1 that has been tampered with in an unauthorized manner.

Also, in a case where the hash values are not identical in step S504 (step S504: NO), data stored in the secure storage unit 103 may be completely erased by overwriting the secure storage unit 103 with dummy data. Furthermore, the encrypted save data 206 remaining in the external memory 501, if any, may be erased as well.

In this way, data that has been tampered with is completely erased from the built-in apparatus 1, thereby avoiding risks such as a case where the CPU 110 accidentally performs processes using data that has been tampered with in the past.

Note that if the encrypted save data 206 remains in the external memory 501 after the system LSI 1000 switches back to the normal power mode, an unauthorized analyst may analyze the encrypted save data 206. Therefore, the encrypted save data 206 in the external memory 501 may be erased after the process of step S504, regardless of the result of the judgment of step S504.

(3) Process of Saving/Process of Restoring

In the above-described embodiment, the process of saving is performed by the CPU 110 executing the secure program 202. Also, the process of restoring is performed by the CPU 110 executing the restoration program.

However, it is also possible that, for example, the save instruction unit 104 and restore instruction unit 105 directly control the components of the system LSI 1000, without involving the CPU 110.

Furthermore, the functions of the save instruction unit 104 and the restore instruction unit 105 may be included in the CPU 110.

In other words, any structure is acceptable as long as the system LSI 1000 has a functional component for performing the process of saving and the process of restoring in some form, as described in the above embodiment. The structure of the system LSI 1000 is not limited to the one described in the above-described embodiment.

(4) Key Used in Encryption

The key used for encrypting and decrypting the data in the secure storage unit 103 does not always need to be the unique information that is unique to the system LSI 1000. The encryption and decryption may be performed with use of a key common to each of the plurality of system LSIs 1000.

In a case where the data length of the unique information is long, processes of encryption and such cause high load. Therefore, a value obtained by shortening the data length can be used as the key. The data length can be shorten by, for example, calculating a hash value of the data.

Also, the key does not need to be the unique information stored in the unique information storage unit 101. Instead, the key may be generated by the secure program 202, or acquired from outside the system LSI 1000. For example, the key may be data input by a user, or information that is stored in a different region in the built-in apparatus 1 and that is unique to a certain component of the built-in apparatus 1. This makes it possible to apply the present invention to a system LSI that does not have unique information.

(5) Target of Saving

In the above-described embodiment, all of the data stored in the secure storage unit 103 is targeted to be saved into the external memory 501.

However, if the external memory 501 does not have enough free space to save all the data, only part of data, especially the important data, may be saved in the external memory 501. Then, the rest of the data may be discarded.

Also, all of the data stored in the secure storage unit 103 does not need to be encrypted as a whole. Also, a hash value does not need to be calculated from all of the data stored in the secure storage unit 103. Instead, the encryption of data and the calculation of a hash value may be performed separately for each unit, such as the secure program 202, the secure data 203, and the bus encryption key 204. In this case, the judgment of whether or not each data piece has been tampered with needs to be performed with use of the corresponding hash value, while the secure processing device is switching to the normal power mode. Therefore, it is necessary that the hash values and the data pieces that are to be saved are stored in a one-to-one correspondence with each other.

In addition to the data stored in the secure storage unit 103, the values of the registers in the system LSI 1000 and such may be saved in the external memory 501 in the above-described process of saving, and restored to the registers in the above-described process of restoring. In this way, the operation state of the system LSI 1000 is more perfectly saved in the external memory 501. This enables the system LSI 1000 to resume the process thereof perfectly when switching back to the normal power mode.

(6) Destination for Saving

In the above-described embodiment, the data stored in the secure storage unit 103 is saved in the external memory 501.

It is also possible to save the data in a memory that has certain security measures, so as to further improve security.

Also, the data does not always need to be saved in the external memory 501. Instead, part of the data may be saved in the external memory 501, and the rest of the data may be saved in the bus encryption region 502. For example, it is possible to save, in the external memory 501, the bus encryption key 204 and a program for storing the bus encryption key in the bus encryption key storage register 109. Then, the other data pieces may be saved in the bus encryption region 502. In this case, the bus encryption key 204 in the external memory 501 is first restored to the secure storage unit 103, when the secure processing device switches back to the normal power mode. Next, the bus encryption key is stored in the bus encryption key storage register 109, and then the data saved in the bus encryption region 502 is restored to the secure storage unit 103.

1.4 Other Variations (1) Power Source A503, Power Source B504

The power source A503 and power source B504 do not always have the above-described structure. Instead, the power source A503 may be combined with the power source B504 to be one power source. Then, the destination of power supply may be controlled, depending on whether or not the system LSI 1000 is operating in the power saving mode. Also, in the above-described embodiment, the power source B504 supplies power to the system LSI 1000. However, the power source B504 may supply power to another component included in the built-in apparatus 1.

(2) Timing of Switching between Power Saving Mode and Normal Power Mode

In the above-described embodiment, the built-in apparatus 1 causes the system LSI 1000 to switch between the power saving mode and the normal power mode, based on whether or not a user has performed an operation.

It is also possible that the system LSI 1000 performs the judgment of switching to the power saving mode and such. In this case, the system LSI 1000 may perform such judgments, for example, based on changes in the voltage supplied by the power source B504. Then, the system LSI 1000 may detect (i) a switch to the power saving mode when the voltage is at a predetermined threshold value or more, and (ii) a switch to the normal power mode when the voltage is above the predetermined threshold.

Note that, in the above-described case, data cannot be saved if the power supply from the power source B504 stops before the system LSI 1000 completes the process of saving. Therefore, it is possible to prepare a standby power source, capacitor and such, so as to make sure that power is supplied during a period necessary for the process of saving to be completed.

Also, in the case of detecting a switch to the normal power mode based on a change of the voltage of the power source B504, the change of the voltage may not be detected, since the detection is performed in a state where the power is not being supplied by the power source B504. Therefore, in the case of detecting a switch to the normal power mode by a change of the voltage of the power source B504, the power is preferably supplied by a power source different from the power source B504. For example, the power may be supplied by the power source A503.

Furthermore, judgment of switching to the power saving mode and such may be controlled by the normal program 205. Such judgments may also be performed by hardware designed specifically for the system LSI 1000. It is also possible to provide the save instruction unit 104 and the restore instruction unit 105 with a function of judgment.

Also, the restore instruction unit 105 is not absolutely necessary. Instead, a mechanism outside the system LSI 1000 may detect a switch to the normal power mode. Upon detection, an interrupt may be generated, so that the CPU 110 can execute a restoration program stored in the external memory 501. In this way, the restore instruction unit 105 is no longer necessary. As a result, the degree of integration of the system LSI 1000 is improved by eliminating an excess hardware structure.

Also, a ROM in the system LSI 1000 may store the restoration program. Then, the CPU 110 may directly read the restoration program from the ROM and execute the restoration program, when switching back to the normal power mode. This structure makes it possible to perform the process of restoring even faster, by eliminating the need of a step of storing the restoration program into the secure storage unit 103. Here, the restoration program is preferably stored in a ROM that is not rewritable, so that tampering of the restoration program per se is prevented.

(3) Memory

In the above-described embodiment, the external memory 501, the bus encryption region 502, and the protection storage unit 102 are all volatile memories. However, it is not limited to such as long as the data stored in each memory is not lost even in the power saving mode. For example, a nonvolatile memory or a hard disk may be used instead of the volatile memory. Note that the power source A503 is not necessary when a nonvolatile memory or a hard disk is used as a memory, since data stored therein is retained without power.

In the case where the external memory 501, the bus encryption region 502, and the protection storage unit 102 are volatile memories, data stored therein is lost when the built-in apparatus 1 is turned off. This eliminates a risk such as data stored in the volatile memories being analyzed while the built-in apparatus 1 is turned off.

Also, in the above-described embodiment, the secure storage unit 103 is a volatile memory. However, the secure storage unit 103 may be a nonvolatile memory. Again, in this case, an attack by an unauthorized analyst is prevented in the same manner described in the above embodiment. In other words, the attack is prevented by encrypting data stored in the secure storage unit 103 and saving the encrypted data in the external memory 501, during the process of switching to the power saving mode.

Specifically, when the secure storage unit 103 is a nonvolatile memory, data stored in the secure storage unit 103 is not lost even when the system LSI 1000 is operating in the power saving mode. Therefore, in terms of resuming a process that uses the secure storage unit 103 before and after a switch to the power saving mode, it is not necessary to encrypt data stored in the secure storage unit 103, and save the data in the external memory 501, as described in the above-described embodiment.

However, when the system LSI 1000 switches to the power saving mode while performing a process that uses the secure storage unit 103, the data of the process in midstream remains in the secure storage unit 103. Therefore, an unauthorized analyst may attempt to take time to analyze the data stored in the secure storage unit 103, by switching the system LSI 1000 to the power saving mode. Generally, data stored in the secure storage unit 103 is valuable and thus needs to be stored confidentially.

Therefore, in a case where the secure storage unit 103 is a nonvolatile memory, it is preferable, when switching the system LSI 1000 to the power saving mode, to encrypt data stored in the secure storage unit 103 and save the data into the external memory, and also erase the data stored in the secure storage unit 103, as described in the above embodiment. In this way, when the secure storage unit 103 is a nonvolatile memory, it is possible to prevent an attack by an unauthorized person who attempts to analyze data stored in the secure storage unit 103 whose process is in midstream. Here, the unauthorized person analyzes the data by switching the system LSI 1000 to the power saving mode while the system LSI 1000 is still performing a process that uses the secure storage unit 103.

(4) Implementation using Software or Hardware

In the above-described embodiment, the components of the system LSI 1000 are implemented in hardware. However, it is not limited to such. Instead, the save instruction unit 104, the restore instruction unit 105, and such may be implemented in software. For example, the functions of the save instruction unit 104 and such are implemented in the following manner. First, the functions of switching to the power saving mode and detecting a switch back to the normal power mode are provided for the secure program 202, the secure application 207, the normal program 205 and such. Then, the CPU 110 may execute the secure program 202, the secure application 207, the normal program 205 and such.

The above structure improves the degree of integration of the system LSI 1000, since the hardware resources are reduced.

Furthermore, software and hardware may be combined to improve the accuracy of detection, such as the detection of a switch to the power saving mode.

In short, the degree of integration of a circuit decreases when the components described in the above embodiment are implemented in software as far as possible, since the number of necessary hardware components decreases. Also, when the components are implemented in hardware, processes are performed faster than a case where the components are implemented in software. It is advantageous to use hardware so as to enhance the speed of performance of the processes of saving and restoring, especially when the convenience of users is important.

(5) Others

The system LSI may be referred to as an IC, an LSI, a super LSI or an ultra LSI in accordance with the degree of integration. The present invention of course includes all of the system LSIs realized by the above-described degrees of integration. It is also possible to use an FPGA (Field Programmable Gate Array) that is programmable after the LSI is manufactured, or a reconfigurable processor that can restructure the connection and setting of circuit cells in the LSI.

Furthermore, if a technology of integration that can substitute for the LSI appears by a progress of semiconductor technology or another derivational technology, it is possible to integrate the components by using the technique. A possible field for the integration can be an adaptation of biotechniques.

The present invention may be the methods described above. Also, the present invention may be computer programs that realize the methods in the processes of a CPU, or may be digital signals representing the computer programs.

Also, the present invention may be a computer-readable recording medium on which the computer programs or the digital signals are recorded such as a flexible disk, a hard disk, a CD-ROM, an MO, a DYD, a DYD-ROM, a DYD-RAM, a BD (Blu-ray Disc), and a semiconductor memory.

The above embodiments and the above variations may be combined.

INDUSTRIAL APPLICABILITY

The present invention reduces power requirements and enhances the speed of processes, while ensuring the security of data. Therefore, the present invention is useful for a system LSI and such, that securely process data that needs to be confidential by switching between a power saving mode and a normal power mode. The present invention is especially useful in apparatuses that have such a system LSI and process data related to copyrights.

The invention claimed is:

1. A secure processing device comprising:
a secure storage unit having a first memory that is to be protected from unauthorized access from outside, the first memory holding first target data in a normal power mode and losing the first target data in a power saving mode;
a protection storage unit having a second memory that is to be protected from the unauthorized access from outside, the second memory holding data in the power saving mode;
an encryption/decryption unit operable to encrypt the first target data to generate ciphertext during a first switching process, and decrypt the ciphertext to generate second target data during a second switching process, the first switching process being switching from the normal power mode to the power saving mode, and the second switching process being switching from the power saving mode to the normal power mode;
a generation unit operable to generate a first authentication code based on the first target data during the first switching process, and to generate a second authentication code based on the second target data during the second switching process;
a switch control unit operable to, during the first switching process, cause (i) the generation unit to generate the first authentication code, based on the first target data, (ii) the second memory of the protection storage unit to store therein the first authentication code, (iii) the encryption/decryption unit to encrypt the first target data, and (iv) an external memory to store therein the ciphertext;
an authentication code generation control unit operable to, during the second switching process, cause (i) the encryption/decryption unit to decrypt the ciphertext stored in the external memory, and (ii) the generation unit to generate the second authentication code, based on the second target data;
a judgment unit operable to judge whether or not the second authentication code is identical with the first authentication code; and
a restoration control unit operable to prohibit restoring of the second target data to the secure storage unit when the judgment is in the negative, and restore the second target data to the secure storage unit when the judgment is in the affirmative.

2. The secure processing device of claim 1 that further performs a processing using at least one data piece confidentially, by encrypting the at least one data piece with use of at least one corresponding bus encryption key, and storing the at least one encrypted bus encryption key in a bus encryption region that is an external storage region, wherein
the secure storage unit further stores therein the at least one bus encryption key,
the switch control unit includes
a key saving control unit operable to, during the first switching process, control (i) encryption of the at least one bus encryption key stored in the secure storage unit and (ii) store the at least one encrypted bus encryption key in the external memory, and
the restoration control unit includes:
a key decryption control unit operable to decrypt the at least one encrypted bus encryption key stored in the external memory, to generate at least one decrypted bus encryption key; and
a key restoration unit operable to restore the at least one decrypted bus encryption key to the secure storage unit.

3. The secure processing device of claim 2, further comprising:
   at least one key storage register that stores therein the at least one corresponding bus encryption key, and whose data is lost when the first switching process is completed; and
   at least one bus encryption circuit operable to encrypt data that is to be input to the bus encryption region, and decrypt data that is to be output from the bus encryption region, with use of the at least one bus encryption key stored in the at least one corresponding key storage register, wherein
   the at least one bus encryption key stored in the secure storage unit is identical with the at least one bus encryption key stored in the at least one key storage register, and
   the key restoration unit causes the at least one decrypted bus encryption key to be stored in the at least one corresponding key storage register.

4. The secure processing device of claim 3, further comprising pairs of the key storage registers and the bus encryption circuits, wherein
   the pairs respectively correspond to the data pieces stored in the bus encryption region,
   the bus encryption keys stored in the secure storage unit are identical with the bus encryption keys stored in the key storage registers,
   the key saving control unit, during the first switching process, causes (i) the bus encryption keys stored in the secure storage unit to be encrypted, and (ii) the encrypted bus encryption keys to be stored in the external memory,
   the key decryption control unit decrypts the encrypted bus encryption keys, to generate decrypted bus encryption keys, and
   the key restoration unit restores the decrypted bus encryption keys to the secure storage unit.

5. The secure processing device of claim 1, wherein the protection storage unit is a nonvolatile memory.

6. The secure processing device of claim 1, wherein the protection storage unit is a volatile memory, for which power is supplied even in the power saving mode.

7. The secure processing device of claim 1, wherein
   the generation unit calculates a hash value using a hash function, based on the first target data, and
   the first authentication code generated by the generation unit is the calculated hash value.

8. The secure processing device of claim 1, wherein the restoration control unit further includes:
   a deletion unit operable to delete the ciphertext stored in the external memory, when the judgment unit judges that the first authentication code is not identical with the second authentication code; and
   a discarding unit operable to discard the second target data decrypted by the encryption/decryption unit.

9. The secure processing device of claim 1, further comprising:
   a data deletion unit operable to delete the ciphertext stored in the external memory when returning to the normal power mode.

10. The secure processing device of claim 1, further comprising:
    a unique information storage unit that stores therein device unique information indicating information unique to the secure processing device for identifying the device, wherein
    the encryption/decryption unit encrypts the first target data and decrypts the ciphertext, based on the device unique information.

11. The secure processing device of claim 10, wherein the unique information storage unit has a mechanism for preventing the unauthorized access from outside the secure processing device.

12. The secure processing device of claim 1, wherein
    the secure processing device performs processing using the first target data in the normal power mode,
    the first target data is to be treated confidentially,
    a size of the second memory is smaller than a size of the first memory, and
    a size of the first authentication code is smaller than the first target data.

13. A secure processing device comprising:
    a secure storage unit having a first memory that is to be protected from unauthorized access from outside, the first memory holding first target data in a normal power mode and losing the first target data in a power saving mode;
    a protection storage unit having a second memory that is to be protected from the unauthorized access from outside, the second memory holding data in the power saving mode;
    an encryption/decryption unit operable to encrypt the first target data to generate ciphertext during a first switching process, and decrypt the ciphertext to generate second target data during a second switching process, the first switching process being switching from the normal power mode to the power saving mode, and the second switching process being switching from the power saving mode to the normal power mode;
    a generation unit operable to generate a first authentication code based on the first target data during the first switching process, and to generate a second authentication code based on the second target data during the second switching process;
    a switch control unit operable to, during the first switching process, cause (i) the encryption/decryption unit to encrypt the first target data, (ii) an external memory to store therein the ciphertext, (iii) the generation unit to generate the first authentication code, based on the ciphertext, and (iv) the second memory of the protection storage unit to store therein the first authentication code;
    an authentication code generation control unit operable to, during the second switching process, cause the generation unit to generate the second authentication code, based on the ciphertext stored in the external memory;
    a judgment unit operable to judge whether or not the second authentication code is identical with the first authentication code;
    a restoration control unit operable to limit a process for restoring the ciphertext to the secure storage unit when the judgment is in the negative, and, cause the encryption/decryption unit to decrypt the ciphertext when the judgment is in the affirmative, and restore the second target data in the secure processing device.

14. The secure processing device of claim 13, wherein the restoration control unit limits the process by causing the encryption/decryption unit to not decrypt the ciphertext, when the judgment is in the negative.

15. The secure processing device of claim 13 that further performs a processing using at least one data piece confidentially, by encrypting the at least one data piece with use of at least one corresponding bus encryption key, and storing the at least one encrypted bus encryption key in a bus encryption region that is an external storage region, wherein the secure storage unit further stores therein the at least one bus encryption key, the switch control unit includes a key saving control unit operable to, during the first switching process, control (i) encryption of the at least one bus encryption key stored in the secure storage unit and (ii) store the at least one encrypted bus encryption key in the external memory, and the restoration control unit includes:

a key decryption control unit operable to decrypt the at least one encrypted bus encryption key stored in the external memory, to generate at least one decrypted bus encryption key; and a key restoration unit operable to restore the at least one decrypted bus encryption key to the secure storage unit.

16. The secure processing device of claim 15, further comprising:

at least one key storage register that stores therein the at least one corresponding bus encryption key, and whose data is lost when the first switching process is completed; and at least one bus encryption circuit operable to encrypt data that is to be input to the bus encryption region, and decrypt data that is to be output from the bus encryption region, with use of the at least one bus encryption key stored in the at least one corresponding key storage register, wherein the at least one bus encryption key stored in the secure storage unit is identical with the at least one bus encryption key stored in the at least one key storage register, and the key restoration unit causes the at least one decrypted bus encryption key to be stored in the at least one corresponding key storage register.

17. The secure processing device of claim 16, further comprising pairs of the key storage registers and the bus encryption circuits, wherein the pairs respectively correspond to the data pieces stored in the bus encryption region, the bus encryption keys stored in the secure storage unit are identical with the bus encryption keys stored in the key storage registers, the key saving control unit, during the first switching process, causes (i) the bus encryption keys stored in the secure storage unit to be encrypted, and (ii) the encrypted bus encryption keys to be stored in the external memory, the key decryption control unit decrypts the encrypted bus encryption keys, to generate decrypted bus encryption keys, and the key restoration unit restores the decrypted bus encryption keys to the secure storage unit.

18. The secure processing device of claim 13, wherein the restoration control unit further includes:

a deletion unit operable to delete the ciphertext stored in the external memory, when the judgment unit judges that the first authentication code is not identical with the second authentication code.

19. The secure processing device of claim 13, wherein the secure processing device performs processing using the first target data in the normal power mode, the first target data is to be treated confidentially, a size of the second memory is smaller than a size of the first memory, and a size of the first authentication code is smaller than the first target data.

20. An information processing method used in a secure processing device, wherein the secure processing device comprises:

a secure storage unit having a first memory that is to be protected from unauthorized access from outside, the first memory holding first target data in a normal power mode and losing the first target data in a power saving mode;

a protection storage unit having a second memory that is to be protected from the unauthorized access from outside, the second memory holding data in the power saving mode, and the information processing method comprises the steps of:

encrypting the first target data to generate ciphertext during a first switching process, and decrypting the ciphertext to generate second target data during a second switching process, the first switching process being switching from the normal power mode to the power saving mode, and the second switching process being switching from the power saving mode to the normal power mode;

generating a first authentication code based on the first target data during the first switching process, and a second authentication code based on the second target data during the second switching process;

during the first switching process, causing (i) the first authentication code to be generated in the generating step, based on the first target data, (ii) the first authentication code to be stored in the second memory of the protection storage unit, (iii) the first target data to be encrypted in the encrypting step, and (iv) the ciphertext to be stored in an external memory;

during the second switching process, causing (i) the ciphertext stored in the external memory to be decrypted in the encrypting step, and (ii) the second authentication code to be generated in the generating step, based on the second target data;

judging whether or not the second authentication code is identical with the first authentication code; and prohibiting restoring of the second target data to the secure storage unit when the judgment is in the negative, and restoring the second target data to the secure storage unit when the judgment is in the affirmative.

21. The information process method of claim 20, wherein the secure processing device performs processing using the first target data in the normal power mode, the first target data is to be treated confidentially, a size of the second memory is smaller than a size of the first memory, and a size of the first authentication code is smaller than the first target data.

22. A computer-readable storage medium having a control program stored thereon for controlling an operation of a secure processing device, wherein the secure processing device comprises:

a secure storage unit having a first memory that is to be protected from unauthorized access from outside, the first memory holding first target data in a normal power mode and losing the first target data in a power saving mode;

a protection storage unit having a second memory that is to be protected from the unauthorized access from outside, the second memory holding data in the power saving mode, and the control program causes the secure processing device to perform a method comprising the steps of:

encrypting the first target data to generate ciphertext during a first switching process, and decrypting the ciphertext to generate second target data during a second switching process, the first switching process being switching from the normal power mode to the power saving mode, and the second switching process being switching from the power saving mode to the normal power mode;

generating a first authentication code based on the first target data during the first switching process, and a second authentication code based on the second target data during the second switching process;

during the first switching process, causing (i) the first authentication code to be generated in the generating step, based on the first target data, (ii) the first authentication code to be stored in the second memory of the protection storage unit, (iii) the first target data to be encrypted in the encrypting step, and (iv) the ciphertext to be stored in an external memory;

during the second switching process, causing (i) the ciphertext stored in the external memory to be decrypted in the encrypting step, and (ii) the second authentication code to be generated in the generating step, based on the second target data;

judging whether or not the second authentication code is identical with the first authentication code; and prohibiting restoring of the second target data into the secure storage unit when the judgment is in the negative, and restoring the second target data to the secure storage unit when the judgment is in the affirmative.

23. The computer-readable medium of claim 22, wherein
the secure processing device performs processing using the first target data in the normal power mode,
the first target data is to be treated confidentially,
a size of the second memory is smaller than a size of the first memory, and
a size of the first authentication code is smaller than the first target data.

24. An information processing method used in a secure processing device, wherein
the secure processing device comprises:
a secure storage unit having a first memory that is to be protected from unauthorized access from outside, the first memory holding first target data in a normal power mode and losing the first target data in a power saving mode;
a protection storage unit having a second memory that is to be protected from the unauthorized access from outside, the second memory holding data in the power saving mode, and
the information processing method comprises the steps of:
encrypting the first target data to generate ciphertext during a first switching process, and decrypting the ciphertext to generate second target data during a second switching process, the first switching process being switching from the normal power mode to the power saving mode, and the second switching process being switching from the power saving mode to the normal power mode;
generating a first authentication code based on the first target data during the first switching process, and a second authentication code based on the second target data during the second switching process;
during the first switching process, causing (i) the first target data to be encrypted in the encrypting step, (ii) the ciphertext to be stored in an external memory, (iii) the first authentication code to be generated in the generating step, based on the ciphertext, and (iv) the first authentication code to be stored in the second memory of the protection storage unit;
during the second switching process, causing the second authentication code to be generated in the generating step, based on the ciphertext stored in the external memory;
judging whether or not the second authentication code is identical with the first authentication code; and
limiting a process for restoring the ciphertext to the secure storage unit when the judgment is in the negative, and, causing the ciphertext to be decrypted in the encrypting step when the judgment is in the affirmative, and the second target data to be restored to the secure processing device.

25. The information processing method of claim 24, wherein
the secure processing device performs processing using the first target data in the normal power mode,
the first target data is to be treated confidentially,
a size of the second memory is smaller than a size of the first memory, and
a size of the first authentication code is smaller than the first target data.

26. A computer-readable storage medium having a control program stored thereon for controlling an operation of a secure processing device, wherein
the secure processing device comprises:
a secure storage unit having a first memory that is to be protected from unauthorized access from outside, the first memory holding first target data in a normal power mode and losing the first target data in a power saving mode;
a protection storage unit having a second memory that is to be protected from the unauthorized access from outside, the second memory holding data in the power saving mode, and
the control program causes the secure processing device to perform a method comprising the steps of:
encrypting the first target data to generate ciphertext during a first switching process, and decrypting the ciphertext to generate second target data during a second switching process, the first switching process being switching from the normal power mode to the power saving mode, and the second switching process being switching from the power saving mode to the normal power mode;
generating a first authentication code based on the first target data during the first switching process, and a second authentication code based on the second target data during the second switching process;
during the first switching process, causing (i) the first target data to be encrypted in the encrypting step, (ii) the ciphertext to be stored in an external memory, (iii) the first authentication code to be generated in the generating step, based on the ciphertext, and (iv) the first authentication code to be stored in the second memory of the protection storage unit;
during the second switching process, causing the second authentication code to be generated in the generating step, based on the ciphertext stored in the external memory;
judging whether or not the second authentication code is identical with the first authentication code; and
limiting a process for restoring the ciphertext to the secure storage unit when the judgment is in the negative, and, causing the ciphertext to be decrypted in the encrypting step when the judgment is in the affirmative, and the second target data to be restored to the secure processing device.

27. The computer-readable medium of claim 26, wherein the secure processing device performs processing using the first target data in the normal power mode, the first target data is to be treated confidentially, a size of the second memory is smaller than a size of the first memory, and a size of the first authentication code is smaller than the first target data.

* * * * *